United States Patent
Seo et al.

(10) Patent No.: US 12,471,112 B2
(45) Date of Patent: *Nov. 11, 2025

(54) METHOD FOR EXCEPTION CASE OF MINIMUM APPLICABLE K0 IN WIRELESS COMMUNICATION SYSTEM, AND TERMINAL USING METHOD

(71) Applicant: LG ELECTRONICS INC., Seoul (KR)

(72) Inventors: Inkwon Seo, Seoul (KR); Sukhyon Yoon, Seoul (KR); Joonkui Ahn, Seoul (KR); Changhwan Park, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,306

(22) Filed: May 1, 2024

(65) Prior Publication Data

US 2024/0292423 A1 Aug. 29, 2024

Related U.S. Application Data

(63) Continuation of application No. 17/891,878, filed on Aug. 19, 2022, now Pat. No. 12,010,702, which is a continuation of application No. 17/383,344, filed on Jul. 22, 2021, now Pat. No. 11,457,466, which is a continuation of application No. PCT/KR2020/004297, filed on Mar. 30, 2020.

(60) Provisional application No. 62/847,296, filed on May 13, 2019.

(30) Foreign Application Priority Data

| Mar. 29, 2019 | (KR) | 10-2019-0037022 |
| Apr. 2, 2019 | (KR) | 10-2019-0038418 |
| May 3, 2019 | (KR) | 10-2019-0052494 |

(51) Int. Cl.
*H04W 72/23* (2023.01)
*H04J 11/00* (2006.01)

(52) U.S. Cl.
CPC .......... *H04W 72/23* (2023.01); *H04J 11/0079* (2013.01)

(58) Field of Classification Search
CPC ............................ H04J 11/0079; H04W 72/23
USPC ......................................................... 370/329
See application file for complete search history.

(56) References Cited

U.S. PATENT DOCUMENTS

| 11,457,466 B2 * | 9/2022 | Seo | H04W 72/23 |
| 12,010,702 B2 * | 6/2024 | Seo | H04W 52/028 |

* cited by examiner

*Primary Examiner* — Peter G Solinsky
(74) *Attorney, Agent, or Firm* — BRYAN CAVE LEIGHTON PAISNER LLP

(57) ABSTRACT

The present specification provides a method for receiving downlink control information performed by a terminal in a wireless communication system, wherein the method is characterized in that the downlink control information is received from a base station and includes minimum applicable scheduling offset information, and the minimum applicable scheduling offset information informs a minimum applicable slot offset and receives a physical downlink shared channel (PDSCH) from the base station on a slot having a slot offset value equal to or greater than a value of the minimum applicable slot offset.

20 Claims, 27 Drawing Sheets

METHOD FOR EXCEPTION CASE OF MINIMUM APPLICABLE K0 IN WIRELESS COMMUNICATION SYSTEM, AND TERMINAL USING METHOD

CROSS-REFERENCE TO RELATED APPLICATIONS

This application is a Continuation of U.S. application Ser. No. 17/891,878, filed on Aug. 19, 2022, which is a Continuation of U.S. application Ser. No. 17/383,344, filed on Jul. 22, 2021 (now U.S. Pat. No. 11,457,466 issued on Sep. 27, 2022), which is a Continuation of International Application No. PCT/KR2020/004297, filed on Mar. 30, 2020, which claims benefit of U.S. Provisional Application No. 62/847,296, filed on May 13, 2019, which claims the benefit of Korean Application No. 10-2019-0037022, filed on Mar. 29, 20219, Korean Application No. 10-2019-0038418, filed on Apr. 2, 2019, and Korean Application No. 10-2019-0052494, filed on May 3, 2019, the contents of which are incorporated by reference herein in their entirety.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

Hereinafter, in the present specification, a method of efficiently reducing power consumption of a UE using cross-slot scheduling is proposed.

SUMMARY OF THE DISCLOSURE

Technical Solutions

In an aspect, a method for receiving downlink control information in a wireless communication system is provided. The method may be performed by a user equipment (UE) and comprise receiving, from a base station, the downlink control information, wherein the downlink control information includes minimum applicable scheduling offset information, wherein the minimum applicable scheduling offset information informs a minimum applicable slot offset and receiving, from the base station, a physical downlink shared channel (PDSCH) on a slot having a value of a slot offset equal to or greater than a value of the minimum applicable slot offset.

Effects of the Disclosure

According to the present specification, there is an effect of efficiently reducing power consumption of the UE by using cross-slot scheduling.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

DESCRIPTION OF EXEMPLARY EMBODIMENTS

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDDCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Figure 1:
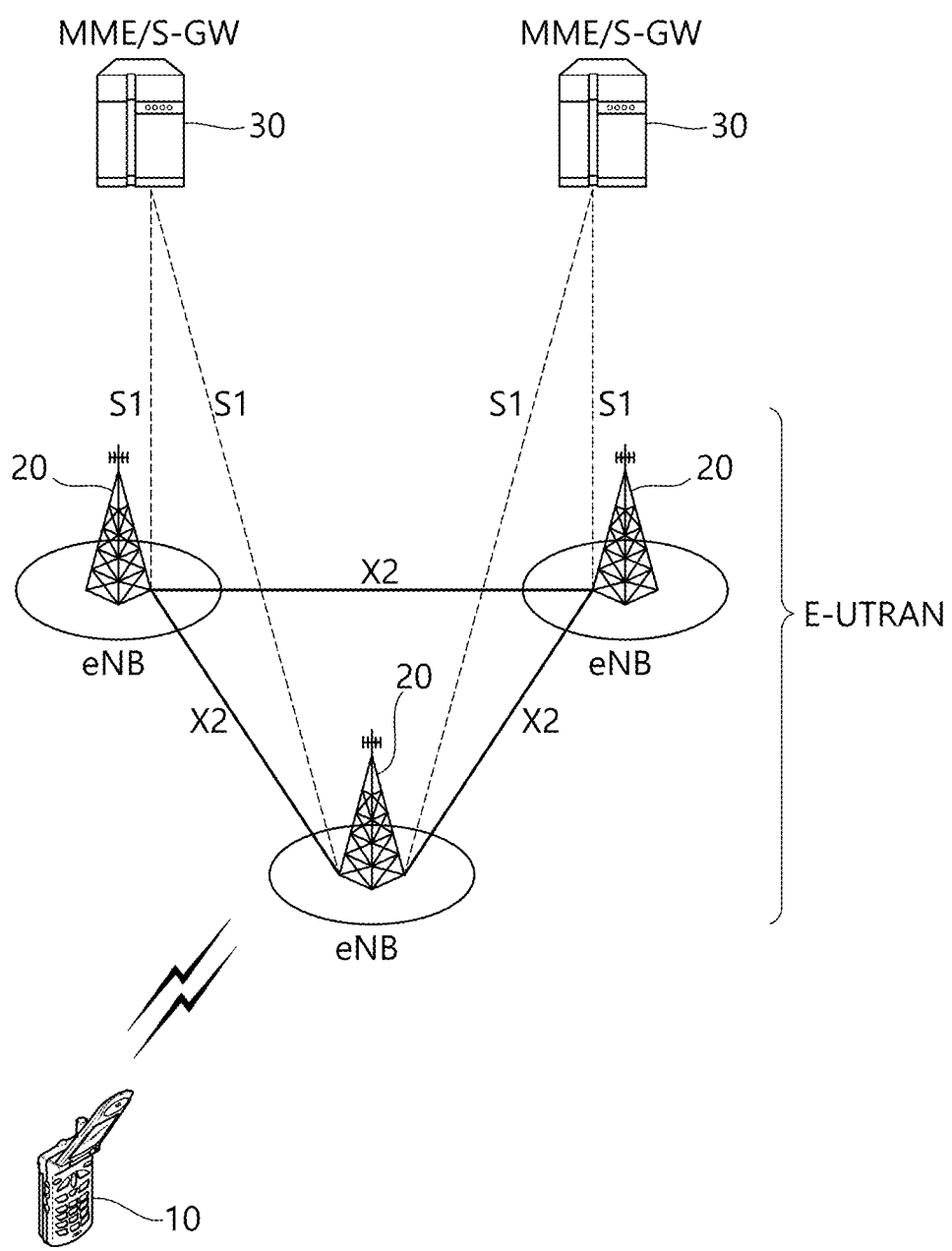
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, and so on. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
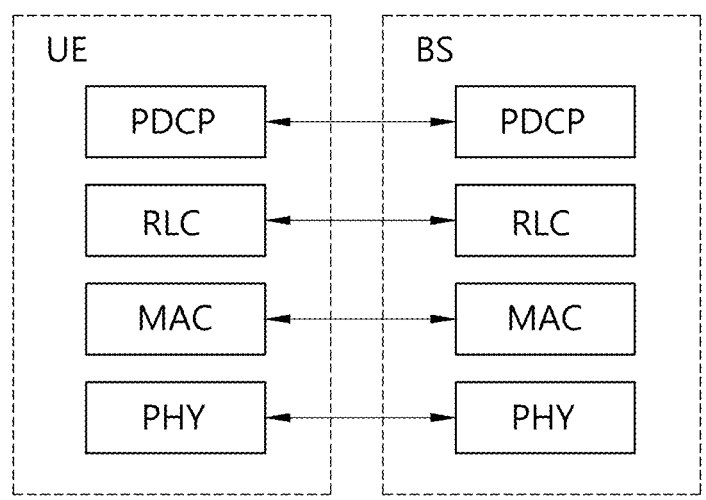
FIG. 2 is a diagram showing a wireless protocol architecture for a user plane.
Figure 3:
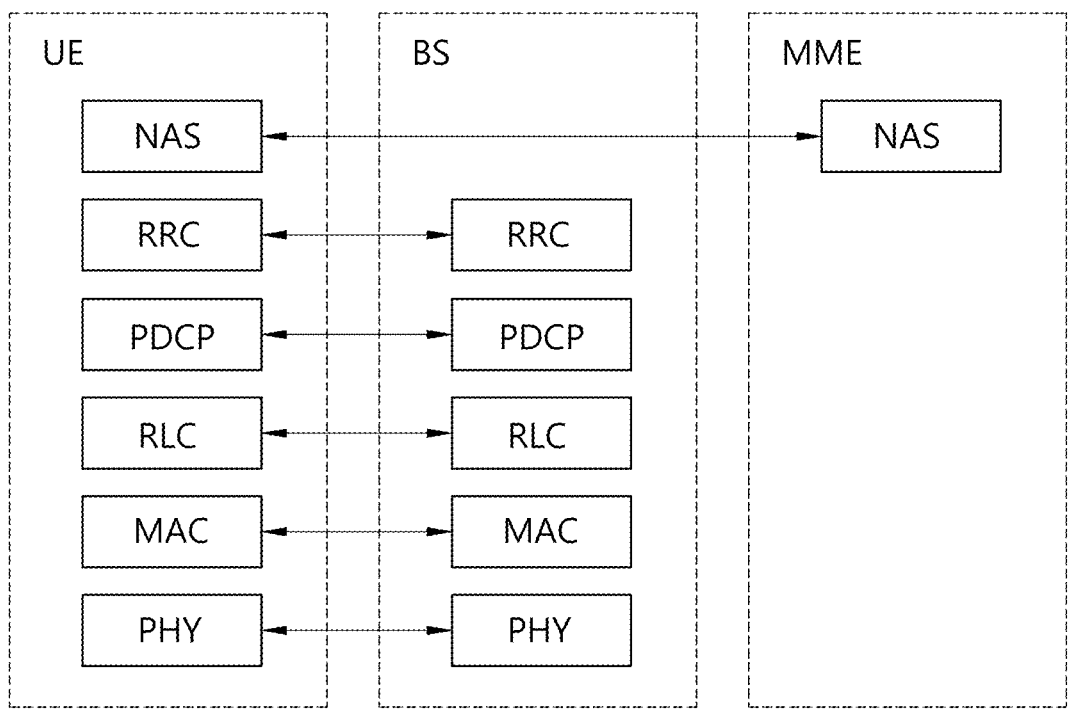
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QOS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

Figure 4:
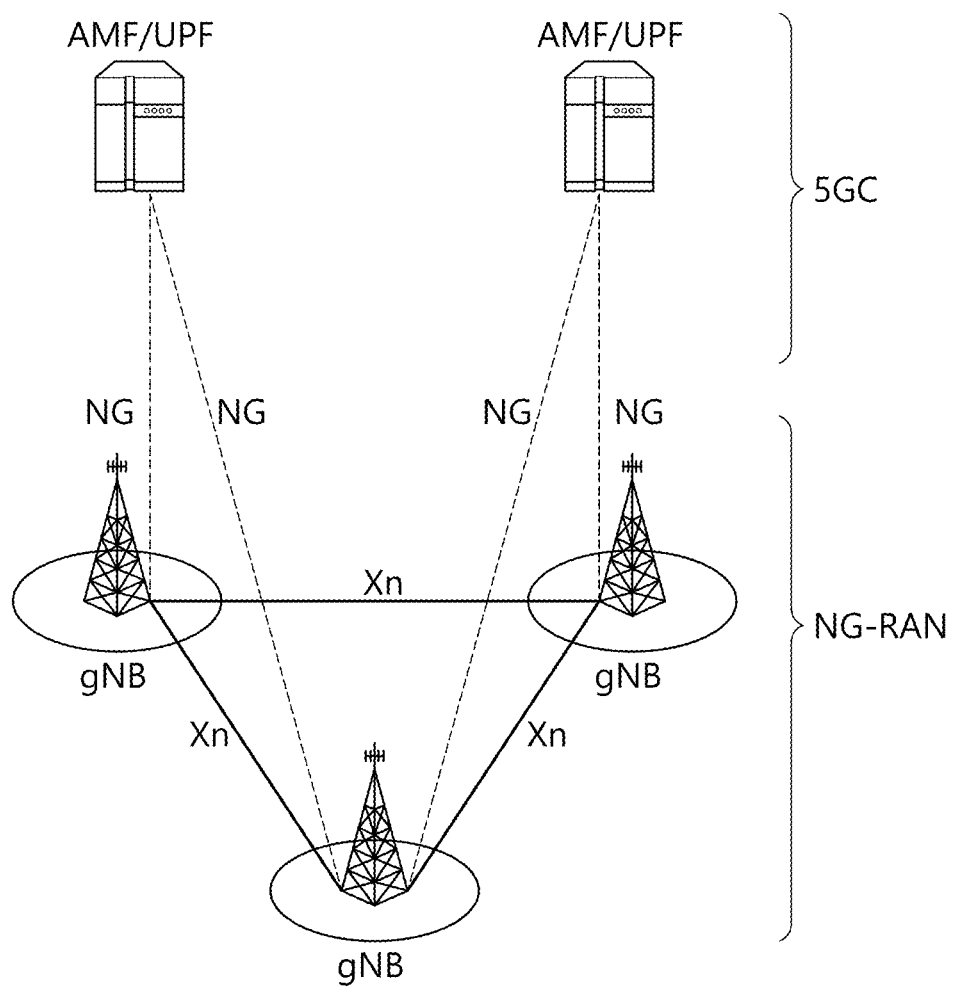
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
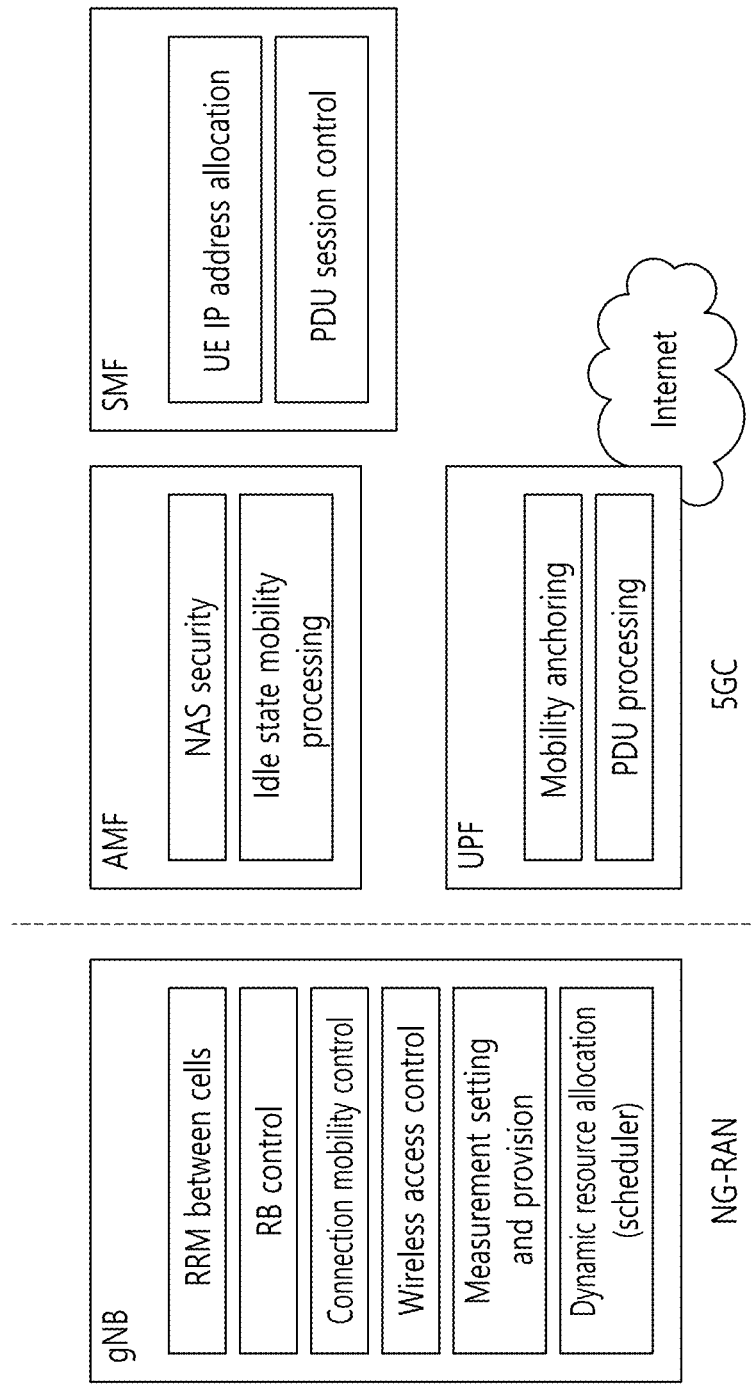
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
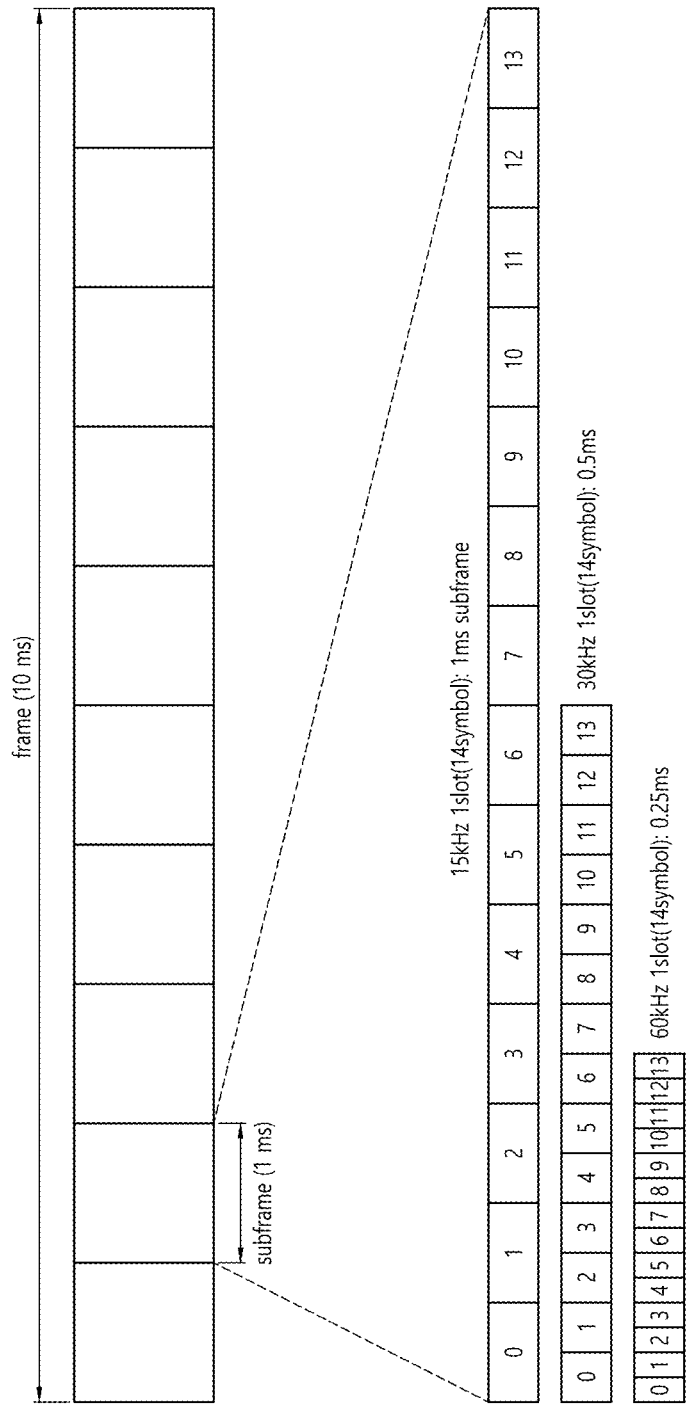
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration $\mu$.

TABLE 1

| $\mu$ | $\Delta f = 2^\mu \cdot 15$ [kHz] | CP(Cyclic prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows $\mu$=0, 1, and 2.

A physical downlink control channel (PDCCH) may include one or more control channel elements (CCEs) as shown in Table 3 below.

TABLE 3

| Aggregation level | Number of CCEs |
| --- | --- |
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. Meanwhile, in the NR, a new unit called a control resource set (CORESET) may be introduced. A UE may receive the PDCCH in the CORESET.

Figure 7:
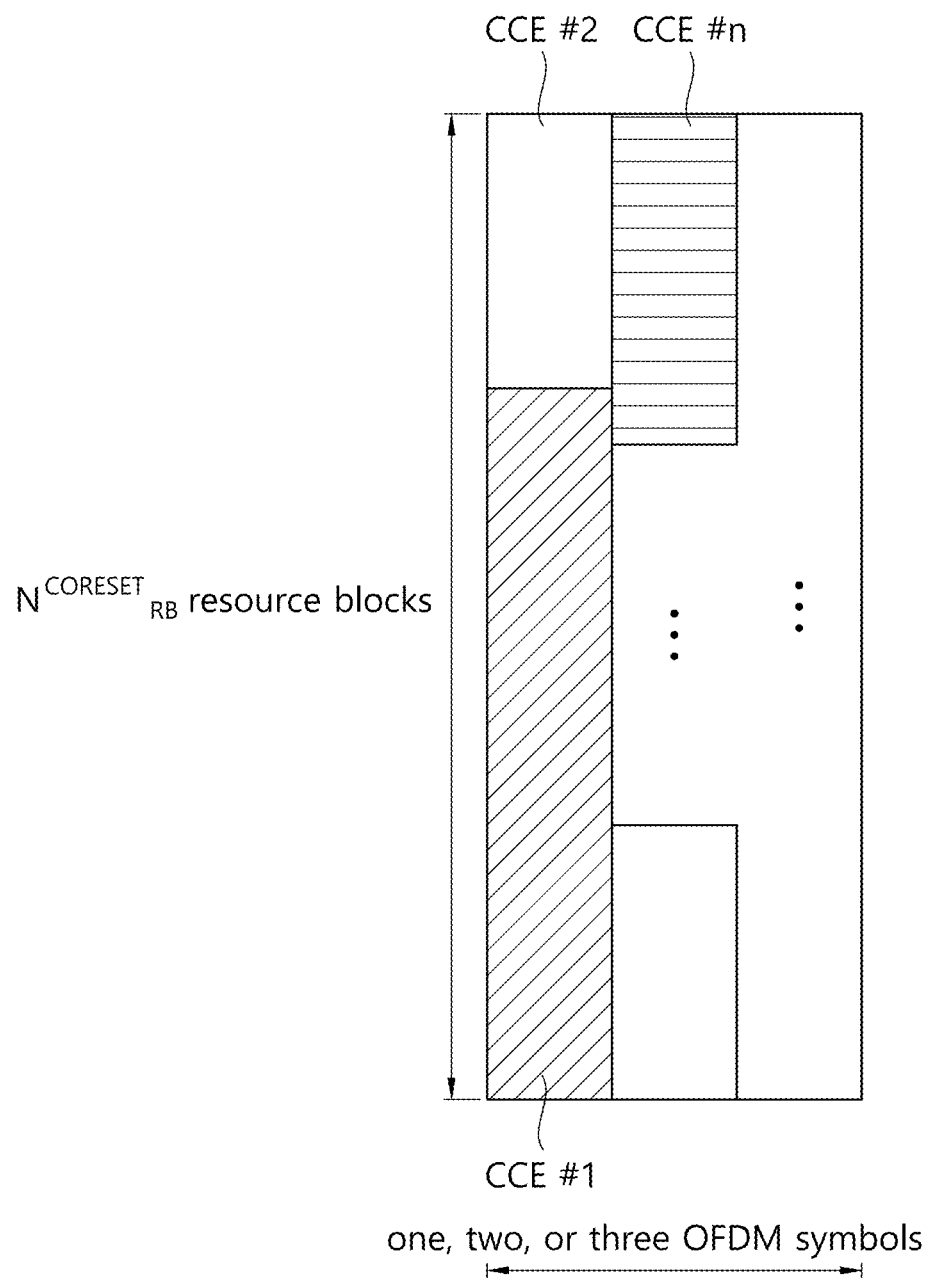
FIG. 7 illustrates a CORESET.

FIG. 7 illustrates a CORESET.

Referring to FIG. 7, the CORESET may include $N^{CORESET}_{RB}$ resource blocks in the frequency domain and $N^{CORESET}_{symb} \in \{1, 2, 3\}$ symbols in the time domain. $N^{CORESET}_{RB}$ and $N^{CORESET}_{symb}$ may be provided by a base station (BS) through higher layer signaling. As shown in FIG. 7, a plurality of CCEs (or REGs) may be included in the CORESET.

The UE may attempt to detect a PDCCH in units of 1, 2, 4, 8 or 16 CCEs in the CORESET. One or a plurality of CCEs for attempting PDCCH detection may be referred to as PDCCH candidates.

A plurality of CORESETs may be configured for the UE.

Figure 8:
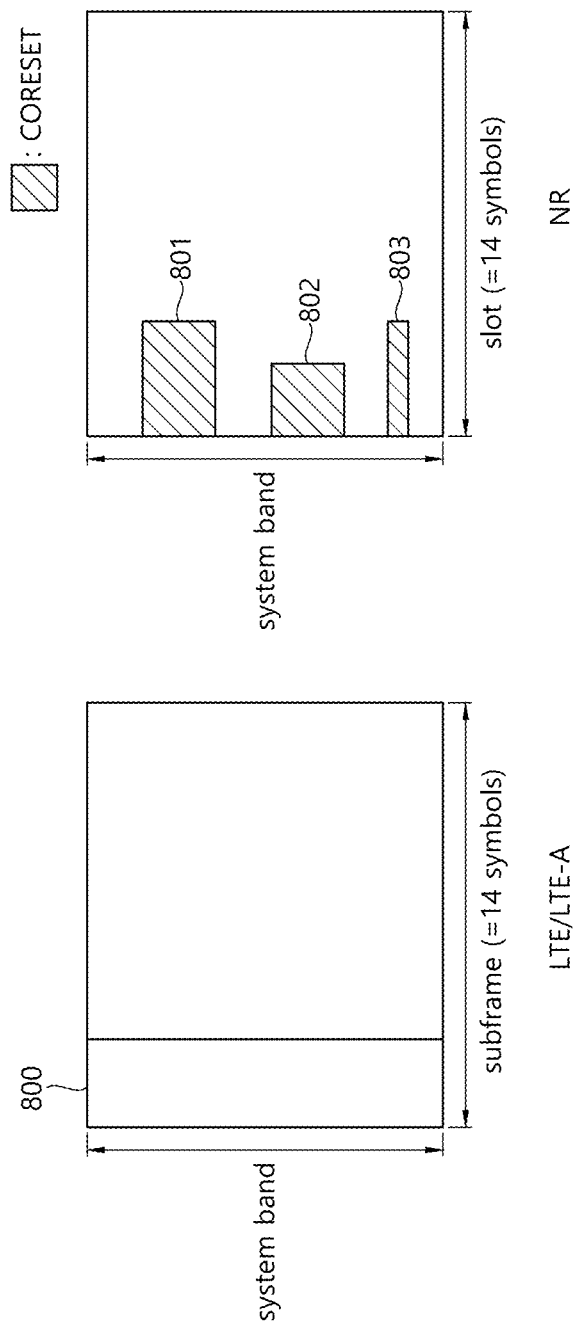
FIG. 8 is a view illustrating a difference between a legacy control region and a CORESET in the NR.

FIG. 8 is a view illustrating a difference between a legacy control region and a CORESET in the NR.

Referring to FIG. 8, a control region 800 in the legacy wireless communication system (e.g., LTE/LTE-A) is configured in the entire system band used by a BS. All terminals, excluding some UEs that support only a narrow band (e.g., eMTC/NB-IoT terminals), were supposed to be able to receive wireless signals of the entire system band of the BS in order to properly receive/decode control information transmitted from the BS.

Meanwhile, in the NR, the aforementioned CORESET was introduced. CORESETs (801, 802, 803) may be radio resources for control information that the UE should receive and may use only a part of the system band, not the entire system band. The BS may allocate the CORESET to each terminal, and may transmit control information through the allocated CORESET. For example, in FIG. 8, a first CORESET (801) may be allocated to UE 1, a second CORESET (802) may be allocated to UE 2, and a third CORESET (803) may be allocated to UE 3. The UE in the NR may receive the control information from the BS even if the UE does not necessarily receive the entire system band.

The CORESET may include a UE-specific CORESET for transmitting UE-specific control information and a common CORESET for transmitting control information common to all UEs.

Meanwhile, in the NR, high reliability may be required depending on an application field, and in this context, a target block error rate (BLER) for a downlink control information (DCI) transmitted through a downlink control channel (e.g., physical downlink control channel (PDCCH)) may be significantly lower than that of the related art. As an example of a method for satisfying the requirement for such high reliability, the amount of contents included in the DCI may be reduced and/or the amount of resources used in DCI transmission may be increased. Here, the resource may include at least one of a resource in the time domain, a resource in the frequency domain, a resource in a code domain, and a resource in a spatial domain.

The following technologies/characteristics may be applied to NR.

<Self-Contained Subframe Structure>

Figure 9:
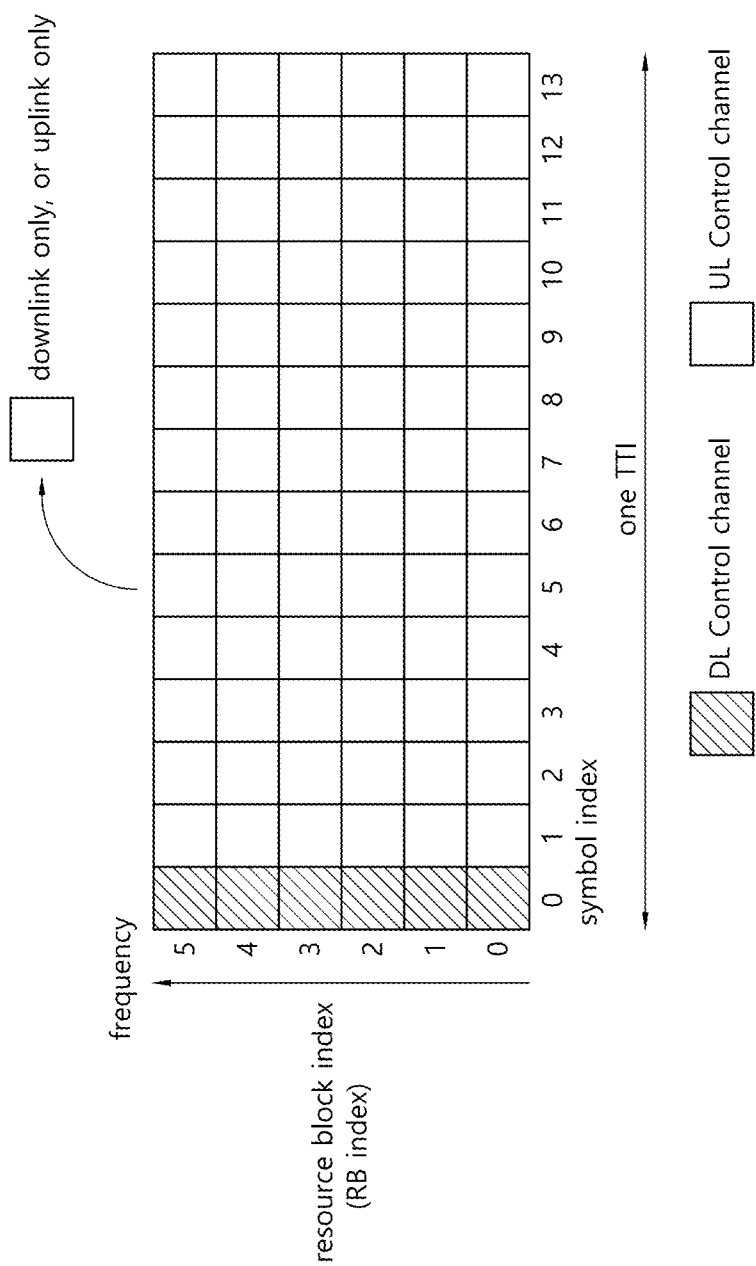
FIG. 9 illustrates an example of a frame structure for the new radio access technology (new RAT).

FIG. 9 illustrates an example of a frame structure for the new radio access technology (new RAT).

In NR, as a purpose for minimizing latency, as shown in FIG. 9, a structure having a control channel and a data channel being processed with Time Division Multiplexing (TDM), within one TTI, may be considered as one type of frame structure.

In FIG. 9, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

<Analog Beamforming #1>

In a Millimeter Wave (mmW), since the wavelength becomes short, installation of multiple antenna elements on a same surface becomes possible. That is, on a 30 GHz band, the wavelength is 1 cm, thereby enabling installation of a total of 100 antenna elements to be performed on a 5 by 5 cm panel in a 2-dimension (2D) alignment format at intervals of 0.5 wavelength (lambda). Therefore, in mmW, coverage shall be extended or throughput shall be increased by increasing beamforming (BF) gain using multiple antenna elements.

In this case, when a Transceiver Unit (TXRU) is provided so as to enable transport power and phase adjustment to be performed per antenna element, independent beamforming per frequency resource may be performed. However, there lies a problem of reducing effectiveness in light of cost in case of installing TXRU to all of the 100 or more antenna elements. Therefore, a method of mapping multiple antenna elements to one TXRU and adjusting beam direction by using an analog phase shifter is being considered. Since such analog beamforming method can only form a single beam direction within a full band, it is disadvantageous in that in cannot provide frequency selective beamforming.

As an intermediate form of digital beamforming (digital BF) and analog beamforming (analog BF), hybrid beamforming (hybrid BF) having B number of TXRUs, which is less than Q number of antenna elements, may be considered. In this case, although there are differences according to connection methods between the B number of TXRUs and the Q number of antenna elements, a direction of a beam that may be transmitted simultaneously shall be limited to B or below.

<Analog Beamforming #2>

In an NR system, in case multiple antennas are used, the usage of a hybrid beamforming method, which is a combination of digital beamforming and analog beamforming, is rising. At this point, analog beamforming is advantageous in that it performs precoding (or combining) at an RF end, thereby reducing the number of RF chains and the number of D/A (or A/D) converters as well as achieving a performance that is proximate to digital beamforming. For simplicity, the hybrid beamforming structure may be expressed as N number of TXRUs and M number of physical channels. Accordingly, digital beamforming for L number of data layers that are to be transmitted by the transmitter may be expressed as an N by L matrix. Then, after the converted N number of digital signals pass through the TXRU so as to be converted to analog signals, analog beamforming, which is expressed as an M by N matrix, is applied thereto.

Figure 10:
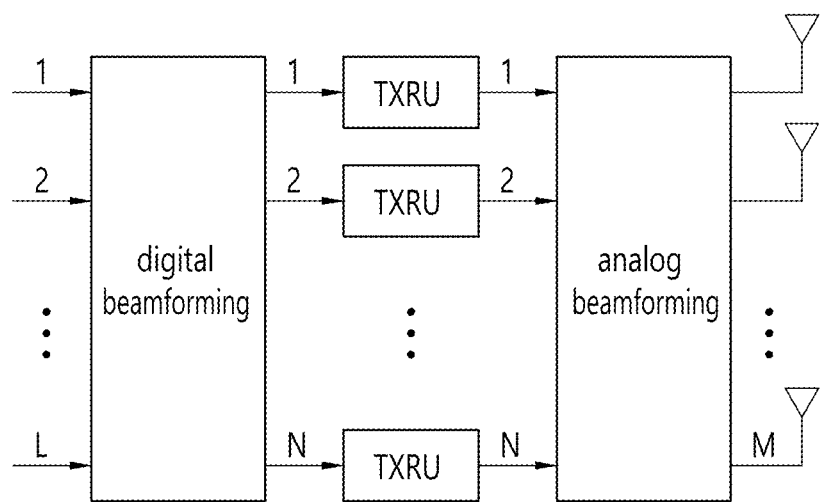
FIG. 10 is an abstract diagram of a hybrid beamforming structure in the viewpoints of the TXRU and physical antenna.

FIG. 10 is an abstract diagram of a hybrid beamforming structure in the viewpoints of the TXRU and physical antenna.

In FIG. 10, a number of digital beams is equal to L, and a number of analog beams is equal to N. Moreover, NR systems are considering a solution for supporting more efficient beamforming to a UE, which is located in a specific area, by designing the base station to be capable of changing beamforming to symbol units. Furthermore, in FIG. 10, when specific N number of TXRUs and M number of RF antennas are defined as a single antenna panel, a solution of adopting multiple antenna panels capable of having independent hybrid beamforming applied thereto is being considered in the NR system.

As described above, in case the base station uses multiple analog beams, since the analog beams that are advantageous for signal reception per UE may vary, for at least the synchronization signal, system information, paging, and so on, a beam sweeping operation is being considered. Herein, the beam sweeping operation allows the multiple analog beams that are to be applied by the base station to be changed per symbol so that all UEs can have reception opportunities.

Figure 11:
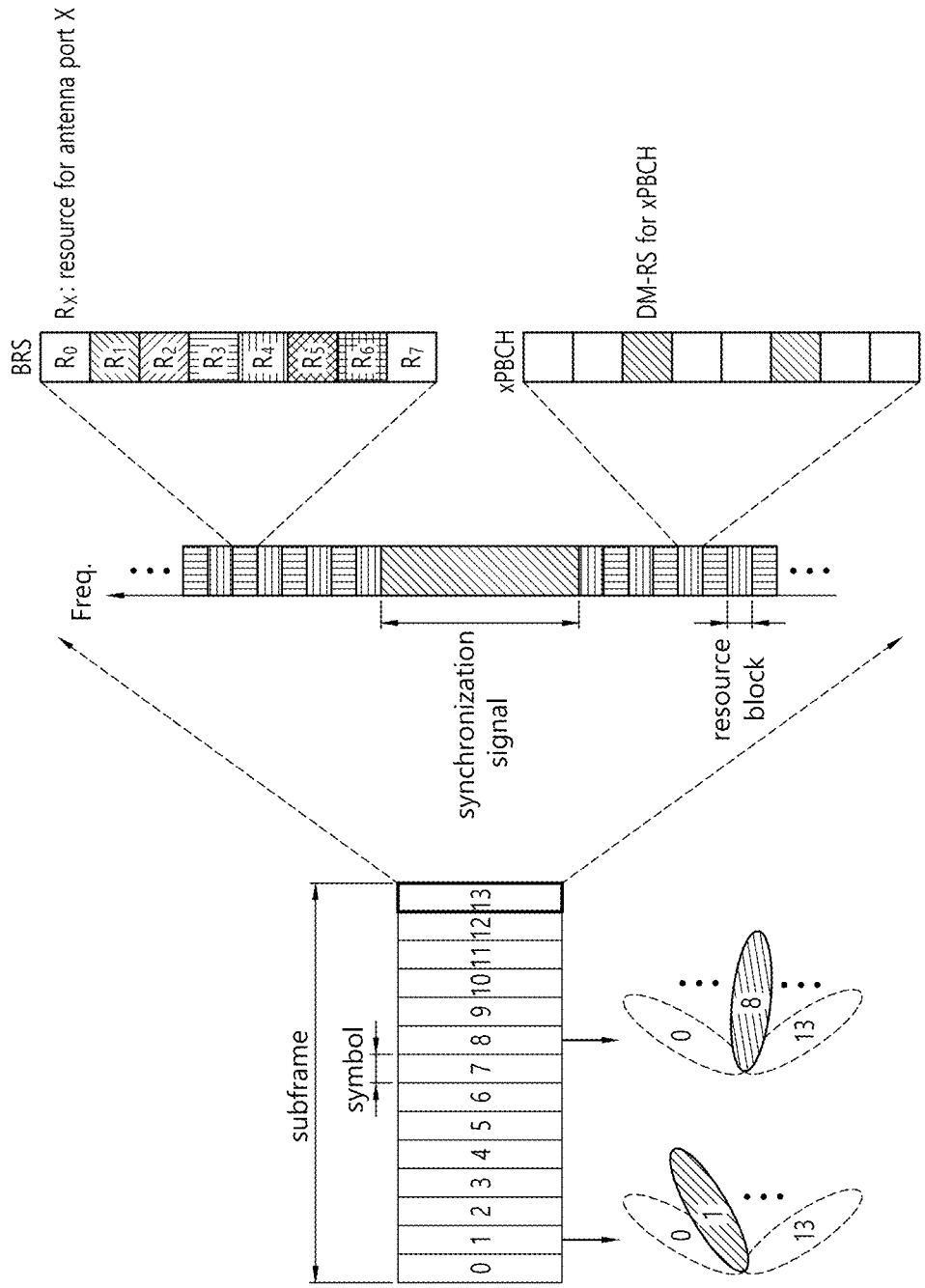
FIG. 11 is a schematic diagram of the beam sweeping operation for a synchronization signal and system information during a downlink (DL) transmission process.

FIG. 11 is a schematic diagram of the beam sweeping operation for a synchronization signal and system information during a downlink (DL) transmission process.

In FIG. 11, a physical resource (or physical channel) through which system information of the NR system is being transmitted by a broadcasting scheme is referred to as a physical broadcast channel (xPBCH). At this point, analog beams belonging to different antenna panels within a single symbol may be transmitted simultaneously. And, in order to measure a channel per analog beam, as shown in FIG. 11, a solution of adopting a beam reference signal (beam RS, BRS), which is a reference signal (RS) being transmitted after having a single analog beam (corresponding to a specific antenna panel) applied thereto. The BRS may be defined for multiple antenna ports, and each antenna port of the BRS may correspond to a single analog beam. At this point, unlike the BRS, a synchronization signal or xPBCH may be transmitted, after having all analog beams within an analog beam group applied thereto, so as to allow a random UE to successfully receive the signal.

Figure 12:
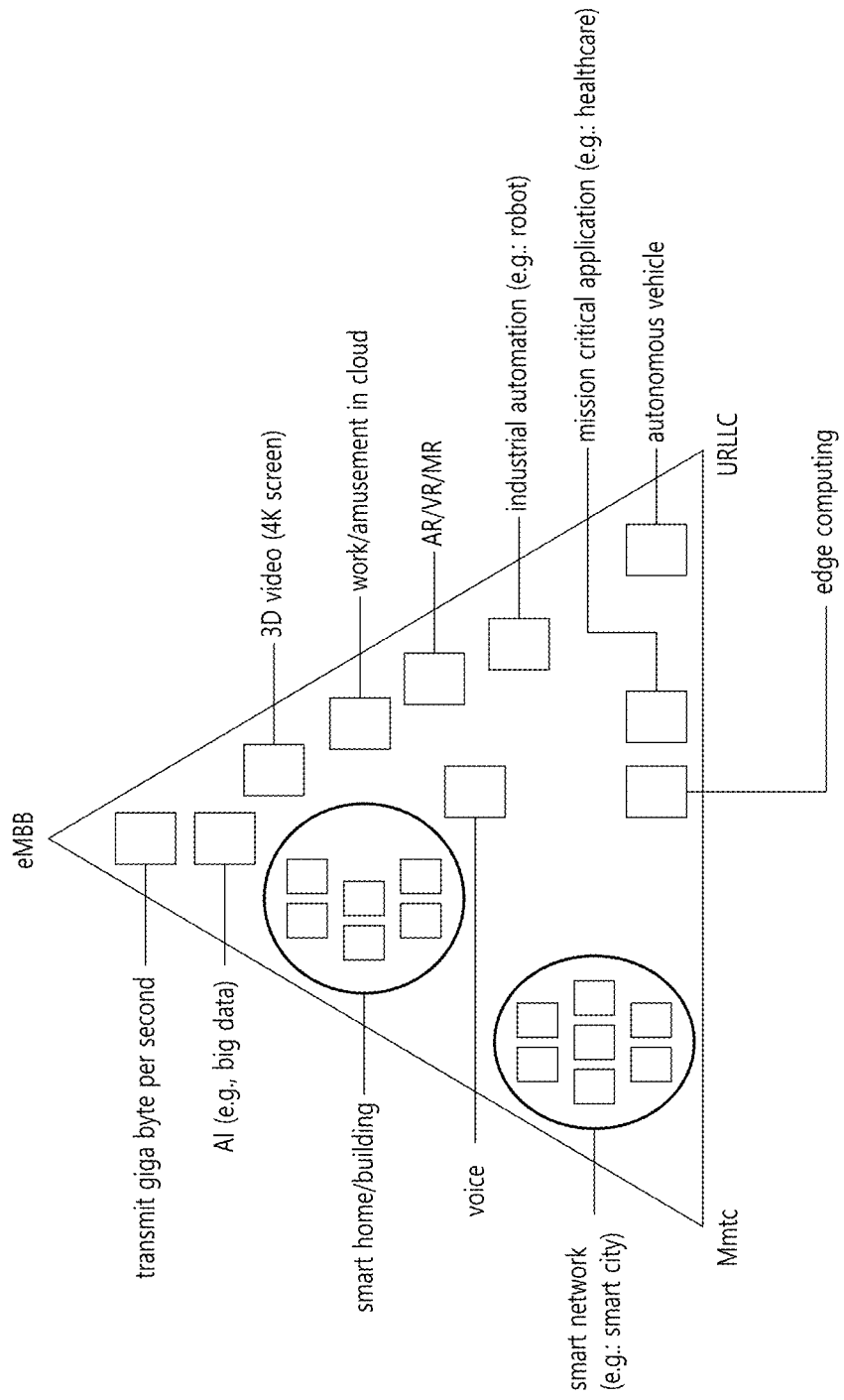
FIG. 12 shows examples of 5G usage scenarios to which the technical features of the present specification can be applied.

FIG. 12 shows examples of 5G usage scenarios to which the technical features of the present specification can be applied. The 5G usage scenarios shown in FIG. 12 are only exemplary, and the technical features of the present specification can be applied to other 5G usage scenarios which are not shown in FIG. 12.

Referring to FIG. 12, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 12 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, a discussion related to power saving will be described.

The terminal's battery life is a factor of the user experience that influences the adoption of 5G handsets and/or services. Power efficiency for 5G NR terminals is not worse than at least LTE, and a study of terminal power consumption may be provided in order to identify and apply techniques and designs for improvement.

ITU-R defines energy efficiency as one of the minimum technical performance requirements of IMT-2020. According to the ITU-R report, e.g. the minimum requirements related to the technical performance of the IMT-2020 air interface, the energy efficiency of a device can be related to support for two aspects: a) efficient data transmission in the loaded case, b) low energy consumption when there is no data. Efficient data transmission in the loaded case is demonstrated by average spectral efficiency. In the absence of data, low energy consumption can be estimated by the sleep rate.

Since the NR system can support high-speed data transmission, it is expected that user data will be burst and serviced for a very short period of time. One efficient terminal power saving mechanism is to trigger the terminal for network access from the power efficiency mode. Unless there is information about network access through the terminal power saving framework, the terminal maintains a power efficiency mode such as a micro-sleep or OFF period within a long DRX period. Instead, when there is no traffic to be transmitted, the network may support the terminal to switch from the network access mode to the power saving mode (e.g., dynamic terminal switching to sleep with a network support signal).

In addition to minimizing power consumption with a new wake-up/go-to-sleep mechanism, it may be provided to reduce power consumption during network access in RRC_CONNECTED mode. In LTE, more than half of the power consumption of the terminal occurs in the connected mode. Power saving techniques should focus on minimizing the main factors of power consumption during network access, including processing of aggregated bandwidth, dynamic number of RF chains and dynamic transmission/reception time and dynamic switching to power efficiency mode. In most cases of LTE field TTI, there is no data or there is little data, so a power saving scheme for dynamic adaptation to other data arrivals should be studied in the RRC-CONNECTED mode. Dynamic adaptation to traffic of various dimensions such as carrier, antenna, beamforming and bandwidth can also be studied. Further, it is necessary to consider how to enhance the switching between the network connection mode and the power saving mode. Both network-assisted and terminal-assisted approaches should be considered for terminal power saving mechanisms.

The terminal also consumes a lot of power for RRM measurement. In particular, the terminal must turn on the power before the DRX ON period for tracking the channel to prepare for RRM measurement. Some of the RRM measurement is not essential, but consumes a lot of terminal power. For example, low mobility terminals do not need to be measured as frequently as high mobility terminals. The network may provide signaling to reduce power consumption for RRM measurement, which is unnecessary for the terminal. Additional terminal support, for example terminal state information, etc., is also useful for enabling the network to reduce terminal power consumption for RRM measurement.

Accordingly, there is a need for research to identify the feasibility and advantages of a technology that enables the implementation of a terminal capable of operating while reducing power consumption.

Hereinafter, UE power saving schemes will be described.

For example, the terminal power saving techniques may consider a power saving signal/channel/procedure for triggering terminal adaptation to traffic and power consumption characteristics, adaptation to frequency changes, adaptation to time changes, adaptation to the antenna, adaptation to the DRX configuration, adaptation to terminal processing capabilities, adaptation to obtain PDCCH monitoring/decoding reduction, terminal power consumption adaptation and a reduction in power consumption in RRM measurement.

Regarding adaptation to the DRX configuration, a downlink shared channel (DL-SCH) featuring support for terminal discontinuous reception (DRX) for enabling terminal power saving, PCH featuring support for terminal DRX enabling terminal power saving (here, the DRX cycle may be indicated to the terminal by the network) and the like may be considered.

Regarding adaptation to the terminal processing capability, the following techniques may be considered. When requested by the network, the terminal reports at least its static terminal radio access capability. The gNB may request the ability of the UE to report based on band information. If allowed by the network, a temporary capability limit request may be sent by the terminal to signal the limited availability of some capabilities (e.g., due to hardware sharing, interference or overheating) to the gNB. Thereafter, the gNB can confirm or reject the request. Temporary capability limitations must be transparent to 5GC. That is, only static functions are stored in 5GC.

Regarding adaptation to obtain PDCCH monitoring/decoding reduction, the following techniques may be considered. The UE monitors the PDCCH candidate set at a monitoring occasion configured in one or more CORESETs configured according to a corresponding search space configuration. CORESET consists of a set of PRBs having a time interval of 1 to 3 OFDM symbols. Resource units REG and CCE are defined in CORESET, and each CCE consists of a set of REGs. The control channel is formed by a set of CCEs. Different code rates for the control channel are implemented by aggregating different numbers of CCEs. Interleaved and non-interleaved CCE-REG mapping is supported in CORESET.

Regarding the power saving signal/channel/procedure for triggering terminal power consumption adaptation, the following technique may be considered. In order to enable reasonable terminal battery consumption when carrier aggregation (CA) is configured, an activation/deactivation mechanism of cells is supported. When one cell is deactivated, the UE does not need to receive a corresponding PDCCH or PDSCH, cannot perform a corresponding uplink transmission, and does not need to perform a channel quality indicator (CQI) measurement. Conversely, when one cell is activated, the UE must receive the PDCH and PDCCH (if the UE is configured to monitor the PDCCH from this SCell), and is expected to be able to perform CQI measurement. The NG-RAN prevents the SCell of the secondary PUCCH group (the group of SCells in which PUCCH signaling is associated with the PUCCH of the PUCCH SCell) from being activated while the PUCCH SCell (secondary cell composed of PUCCH) is deactivated. The NG-RAN causes the SCell mapped to the PUCCH SCell to be deactivated before the PUCCH SCell is changed or removed.

When reconfiguring without mobility control information, the SCell added to the set of serving cells is initially deactivated, and the (unchanged or reconfigured) SCells remaining in the set of serving cells do not change the activate state (e.g. active or inactive).

SCells are deactivated when reconfiguring with mobility control information (e.g., handover).

In order to enable reasonable battery consumption when BA (bandwidth adaptation) is configured, only one uplink BWP and one downlink BWP or only one downlink/uplink BWP pair for each uplink carrier may be activated at once in the active serving cell, and all other BWPs configured in the terminal are deactivated. In deactivated BWPs, the UE does not monitor the PDCCH and does not transmit on the PUCCH, PRACH and UL-SCH.

For BA, the terminal's reception and transmission bandwidth need not be as wide as the cell's bandwidth and can be adjusted: the width can be commanded to change (e.g. shrink during periods of low activity to save power), position in the frequency domain can be moved (e.g. to increase scheduling flexibility), the subcarrier spacing can be ordered to change (e.g., to allow different services). A subset of the total cell bandwidth of a cell is referred to as a bandwidth part (BWP), the BA is obtained by configuring the BWP(s) to the UE and knowing that it is currently active among the BWPs configured to the UE. When the BA is configured, the terminal only needs to monitor the PDCCH on one active BWP. That is, there is no need to monitor the PDCCH on the entire downlink frequency of the cell. The BWP inactive timer (independent of the DRX inactive timer described above) is used to convert the active BWP to the default BWP: the timer is restarted when the PDCCH decoding succeeds, switching to the default BWP occurs when the timer expires.

Figure 13:
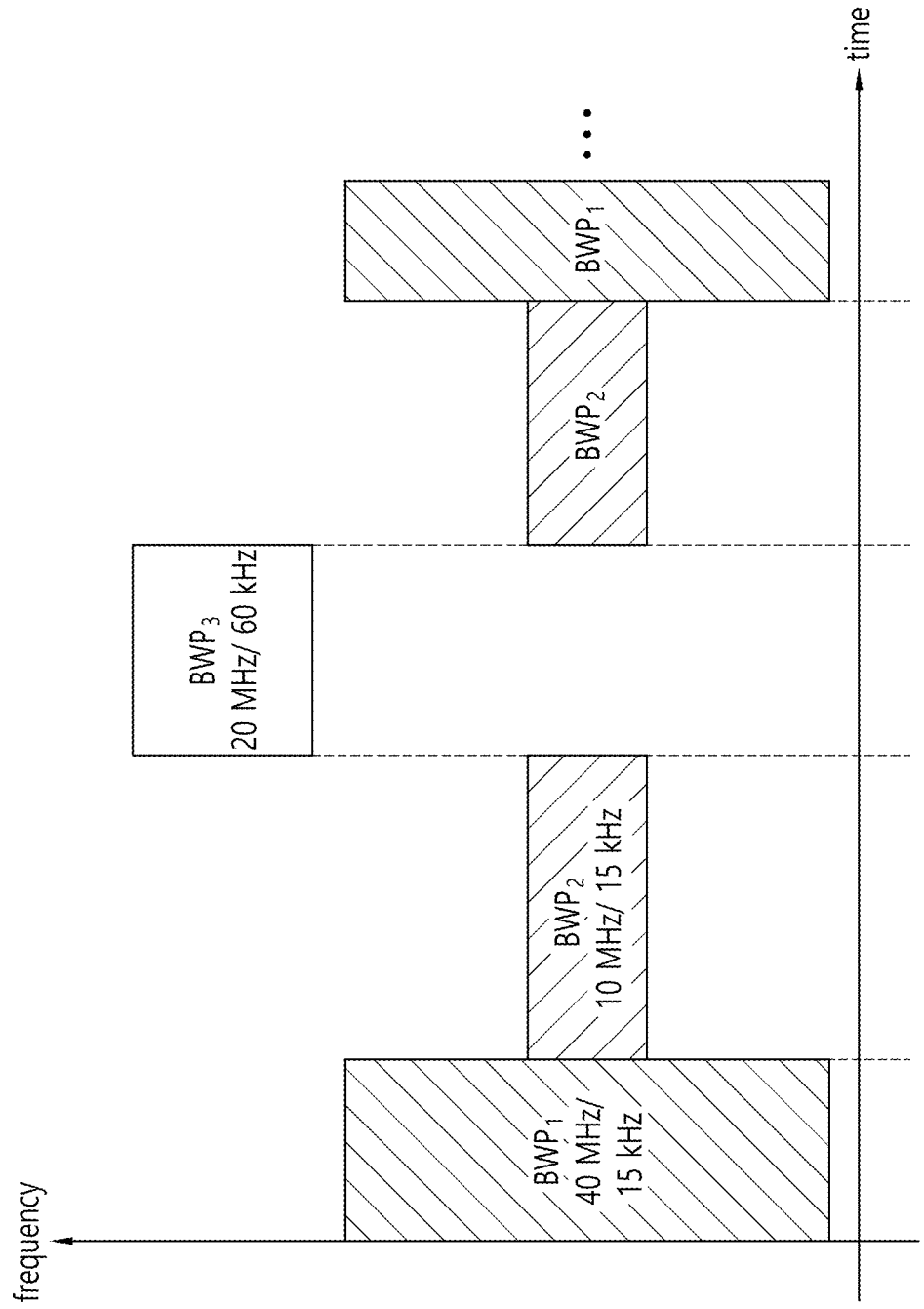
FIG. 13 illustrates a scenario in which three different bandwidth parts are configured.

FIG. 13 illustrates a scenario in which three different bandwidth parts are configured.

FIG. 13 shows an example in which BWP1, BWP2, and BWP3 are configured on time-frequency resources. BWP1 has a width of 40 MHz and a subcarrier spacing of 15 kHz, BWP2 has a width of 10 MHz and a subcarrier spacing of 15 kHz, and BWP3 may have a width of 20 MHz and a subcarrier spacing of 60 kHz. In other words, each of the bandwidth parts may have different widths and/or different subcarrier spacings.

Regarding the power consumption reduction in RRM measurement, the following technique may be considered. If two measurement types are possible, the RRM configuration may include the beam measurement information related to the SSB(s) (for layer 3 mobility) and the CSI-RS(s) for the reported cell(s). In addition, when CA is configured, the RRM configuration may include a list of best cells on each frequency for which measurement information is available. In addition, the RRM measurement information may include beam measurement for listed cells belonging to the target gNB.

The following techniques can be used in various wireless access systems such as CDMA, FDMA, TDMA, OFDMA, SC-FDMA, and the like. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a wireless technology such as IEEE 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, and Advanced (LTE-A)/LTE-A pro is an evolved version of 3GPP LTE. 3GPP New Radio or New Radio Access Technology (NR) is an evolved version of 3GPP LTE/LTE-A/LTE-A pro.

For clarity, the description is based on a 3GPP communication system (e.g., LTE-A, NR), but the technical idea of the present specification is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. LTE/NR may be referred to as a 3GPP system. "xxx" means standard document detail number. LTE/NR may be collectively referred to as a 3GPP system. Background art, terms, abbreviations, and the like used in the description of the present specification may refer to matters described in standard documents published before the present specification.

Hereinafter, the proposal of the present specification will be described in more detail.

Additional advantages, objects and features of the present specification will be partially described in the following description, it will be apparent to one of ordinary skill in the art or will be learn in part from the practice of this specification upon review of the following. Objects and other advantages of the present specification can be realized and achieved by the accompanying drawings, as well as the structures particularly pointed out in the claims and claims of the present specification.

Cross-slot scheduling can reduce power consumption by reducing unnecessary PDSCH buffering and the like.

However, due to the location of monitoring occasions by a plurality of search space sets, monitoring of common information monitored by a plurality of terminals (i.e. a plurality of user equipments (UEs)) etc., the power saving performance of the cross-slot scheduling may be greatly reduced.

For example, if a monitoring occasion of different search space sets configured with a minimum K0 (Here, K0 may mean a slot offset between the DCI and the PDSCH linked to the DCI (e.g., the PDSCH scheduled by the DCI)) of 1 is located in contiguous slots, it is not possible to switch to a micro sleep due to the monitoring occasion, or there may be a case in which the actual power saving of the UE does not operate, such as a case where the PDSCH scheduled by the previous monitoring occasion may be located in a micro sleep period due to another monitoring occasion.

In order to reduce the power consumption of the UE, 3GPP conducted a power saving study item, and SI conducted a study on cross-slot scheduling as one of the power saving schemes. An example of cross-slot scheduling may be described below through a drawing.

Figure 14:
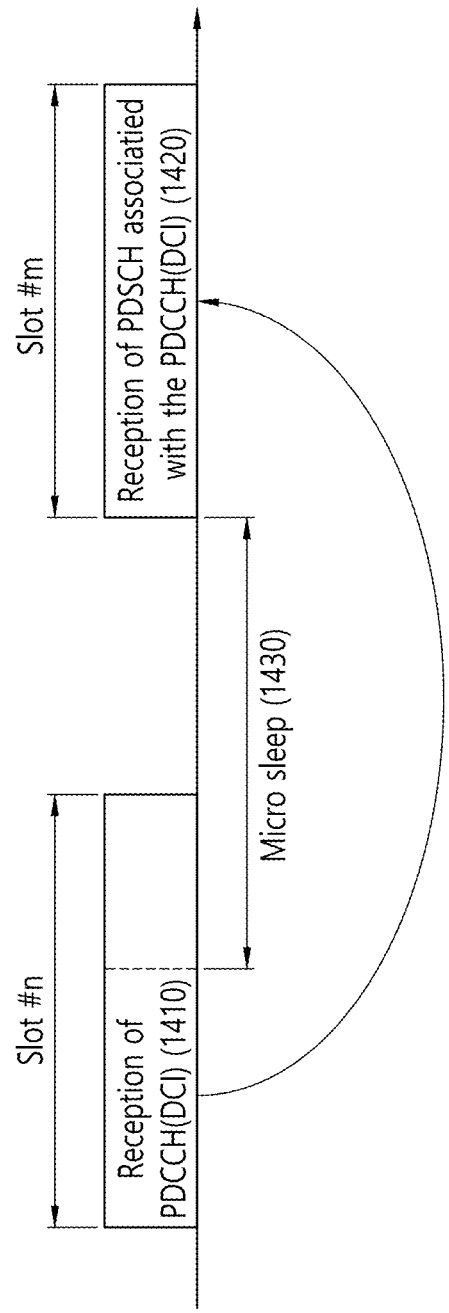
FIG. 14 schematically shows an example of cross-slot scheduling.

FIG. 14 schematically shows an example of cross-slot scheduling.

According to FIG. 14, the UE may perform a reception of PDCCH (DCI) 1410 in slot #n. The terminal may perform a micro sleep 1430 (or a low-power PDCCH reception operation using a low voltage, low clock speed, etc.) in a period in which the PDSCH is guaranteed not to be transmitted. Thereafter, the UE may perform reception 1420 of a PDSCH related to a PDCCH (DCI) in slot #m (corresponding to a resource and/or region) indicated by the received PDCCH (DCI).

The following shows a method and procedure for reducing power consumption in cross-slot scheduling (discussed in the corresponding SI).

Minimum K0>0 and the aperiodic CSI-RS triggering offset is not within the duration—the terminal can switch to micro-sleep after PDCCH reception—no added PDSCH and CSI-RS signal reception within a given duration (e.g., the same slot).

Known to the UE when decoding the PDCCH

Reduction of PDCCH processing within extended micro sleep time and reduced terminal power consumption In order to avoid the need for fast PDCCH processing, a minimum K0>0 is essential.

Terminal assistant information may be considered

A general procedure for a terminal saving scheme when cross-slot scheduling is used.

gNB semi-statically configures the TDRA to the terminal according to the terminal capability All scheduleable TDRA value(s) are K0>=X and K2>=X (here, X>0) (or guarantees that only values larger than X among K0/K2 values of the TDRA table are scheduled)

Determination of the X value may be affected by BWP switching triggered by, for example, DCI (if supported, with cross-slot scheduling)

All aperiodic CSI-RS triggering offset(s) are not less than the X value

The terminal decodes the PDCCH and retrieves the index of the scheduleable TDRA value.

The terminal can enter micro sleep after receiving the last PDCCH symbol

The terminal processes the PDSCH at the start time indicated from the TDRA value As can be seen from the above, cross-slot scheduling can be used for power saving purposes, the network indicates the minimum K0 to the UE (here, K0 represents a slot offset between the DCI and the PDSCH associated with the DCI, for example, when K0=1, this means that the PDSCH is transmitted to the next slot of the slot in which the PDCCH was transmitted). The UE switches to micro sleep for a period of time guaranteed by a minimum K0 after PDCCH reception (precisely, the last symbol of the corresponding CORESET), thereby reducing power consumption due to PDSCH buffering and the like.

The same operation may be applied to K2, and K2 denotes a slot offset between the DCI and the PUSCH associated with the DCI. Accordingly, the K0 operation described in the present specification may be applied to the K2 operation as long as it does not contradict the concept of the specification.

In this specification, a method of efficiently reducing power consumption of a UE using cross-slot scheduling is proposed.

In the present specification, the minimum K0 value configured by the network may fall back to the existing K0 value by signaling of the network or by using a timer or the like (At this time, the existing K0 value may be interpreted as 0 or the minimum value among the K0 values of the configured TDRA table).

This specification may be implemented by the TDRA table configured by the RRC signaling and signaling for whether the power saving mode is applied or not (by RRC, L1, or MAC CE). That is, when instructed to apply the power saving mode, K0 of the smallest value in the TDRA table signaled by RRC is regarded as the minimum K0 in the following specification, and the following specification can be applied. (This may mean that the minimum K0 is not additionally signaled, and the UE considers the smallest value of K0 in the TDRA table signaled in advance as the minimum K0 discussed in this specification.)

For example, if the minimum K0 in the TDRA table indicated by RRC is 1, the network may inform whether or not the power saving mode is applied through RRC, L1, or MAC CE signaling, and when the UE is instructed to apply the power saving mode, it is assumed that the minimum K0 is 1 in the following specification and the UE may perform a power saving operation by applying the scheme proposed below.

In case that such a scheme is applied, the UE performs buffering for the PDSCH when there is no indication for the minimum K0 (for power saving purposes) with respect to the TDRA table signaled for each bandwidth part (BWP), and PDSCH buffering may be skipped based on the minimum value among K0 in the corresponding TDRA table when there is an indication for the minimum K0.

In addition, in the present specification, the minimum K0 is described based on a case where it is determined by implicit determination or is dynamically indicated by L1 or MAC CE signaling, but the minimum K0 may be also determined by RRC signaling, accordingly, the following specification may also be applied when the minimum K0 configured by RRC signaling is used. In addition, when a semi-static configuration such as RRC signaling is used, whether or not the RRC signaled minimum K0 is applied for dynamic adaptation may be signaled by L1 or MAC CE.

In addition, in the following specification, power saving by PDSCH buffering is discussed, but the PDSCH buffering-related operation proposed below can also be applied to downlink signal buffering in preparation for aperiodic CSI-RS transmission.

For example, when the minimum K0 is 1, it may be assumed that there is no transmission of an aperiodic CSI-RS linked to the corresponding PDCCH in a slot monitoring the PDCCH. For example, when a minimum K0 is used for power saving, that is, when PDSCH buffering is not performed within a period guaranteed by the minimum K0, it may be assumed that there is no aperiodic CSI-RS transmission in the corresponding region.

In the present specification, the description is mainly based on K0 (e.g. the number of slots (number, the same hereinafter) between the PDCCH and the scheduled PDSCH, or the delay between the DL grant and the corresponding DL data (PDSCH) reception), but the present specification may be applied to K1 (e.g. the number of slots between PDSCH scheduled in PDCCH and associated PUCCH, or the delay between the DL data (PDSCH) reception and the corresponding ACK (acknowledgement) transmission on the UL) and/or K2 (e.g. the number of slots between the PDCCH and the scheduled PUSCH, or the delay between the UL data (PUSCH) transmission and the UL grant in the DL) as well as K0 in the same manner.

<Indication of Minimum K0>

The minimum K0 can be indicated as follows. The options below can be implemented alone or in combination.

1. Option 1) Multiple Time Domain Resource Allocation (TDRA) Table and Implicit Minimum K0

The smallest K0 value of each table is assumed to be the smallest K0

Determining the default TDRA table (predefined or network indication)

Hereinafter, this option will be described in more detail.

Currently, the TDRA table may be configured for each BWP, and multiple TDRA table(s) may be configured for each BWP for power saving using cross-slot scheduling. In this case, the minimum K0 value in each TDRA table may be implicitly determined as the minimum K0 when the corresponding table is used.

The network may indicate a minimum K0 for cross-slot scheduling, or may indicate one of a plurality of TDRA tables (dynamically using a power saving signal or the like).

When the UE receives the minimum K0 signal, it can be assumed that the TDRA table associated with the minimum K0 is activated, and when the TDRA table is signaled, whether to perform PDSCH buffering may be determined based on the minimum K0 of the corresponding TDRA table.

In addition, when multiple TDRA table(s) are configured, it is suggested to define a default TDRA table in advance or to be configured by the network. In this case, when the minimum K0 is not configured, the default TDRA table may be used for the purpose of an ambiguity period of minimum K0 signaling, a fallback operation for a power saving scheme, and the like.

2. Option 2) Explicit Signaling for Minimum K0 Indication

As another method, the network may configure the TDRA table as before and directly indicate the minimum K0 value. In this case, the UE can operate as follows.

Alt 1) Among the K0 on the table, only the indicated minimum K0 or higher is valid.

In the TDRA table, it can be assumed that it is valid only for K0 that is greater than or equal to the minimum K0 configured by the network. This may mean that PDSCH buffering is not performed in the period guaranteed by the configured minimum K0.

Alt 2) Create a new K0 by adding the minimum K0 to each K0 value in the configured table.

It can be assumed that the minimum K0 value configured by the network means an offset to the K0 value on the TDRA table. That is, when the minimum K0 is signaled from the network to the UE, the UE may update the TDRA table by adding the signaled minimum K0 value to the K0 value of the existing TDRA table.

Alt 3) Apply Alt 2 only to K0=0 rows on the table

The method of adding the offset of Alt 2 can be applied only to content(s) satisfying a specific condition (in the TDRA table). For example, when the offset is signaled, the signaled offset may be added only to content(s) that satisfy the condition of K0=0 among the previously configured TDRA content(s).

<Configurations of Cross-Slot Scheduling for Power Saving>

Hereinafter, a method for increasing a power saving gain by cross-slot scheduling will be described.

1. Configuring the Application Interval of the Minimum K0
    Opt 1) Indicate the interval to which the signaled minimum K0 is applied
    Opt 2) Introduce the timer to determine when minimum K0 is released As mentioned above, cross-slot scheduling can reduce power consumption by reducing unnecessary PDSCH buffering. However, due to the location of a monitoring occasion by a plurality of search space sets, monitoring of common information monitored by a plurality of UEs, etc., the power saving performance of cross-slot scheduling may be greatly reduced.

For example, if the monitoring occasions of different search space sets consisting of a minimum K0 of 1 are located in consecutive slots, the transition to micro sleep is not possible due to the monitoring occasion, or, there may be a case in which the actual power saving of the UE does not operate, such as a case where a PDSCH scheduled by a previous monitoring occasion may be located in a micro sleep period due to another monitoring occasion.

In the present specification, when cross-slot scheduling is used for power saving, it is proposed to use the following method to increase the power saving gain. The following methods can be implemented alone or in combination.

Additionally, the following methods may be applied only when the minimum K0 value is 1 or more. This may include a case where the network configures a minimum K0 value and the corresponding value is 1 or more, as well as a case where the minimum K0 value in the TDRA table configured for a specific BWP is 1 or more. (This may mean that a specific BWP is used for power saving purposes, and may be interpreted as recognizing that the power saving operation is applied to the UE configured to switch to the corresponding BWP.) The following schemes can be applied not only to cross-slot scheduling, but also to other schemes of power saving schemes (e.g., CDRX operation, PDCCH monitoring adaptation, BWP/CA operation).

In addition, since the following operations are defined for the purpose of power saving, there may be a system impact in terms of scheduling flexibility and scheduling availability (e.g., blocking).

Therefore, in the present specification, it is proposed to configure the interval to which the minimum K0 is applied together with the minimum K0, or to determine the release time of the minimum K0 using a timer or the like, this can be commonly applied to the case of using the minimum K0 (in other words, a case that guarantees the PDSCH buffering skip of the UE for a specific period) as well as the following method(s). It may also operate in conjunction with the DRX status in the DRX operation.

For example, it may be assumed that the validity period of the minimum K0 and/or the minimum K0 is applied only to the on-duration in the DRX. This may mean that the validity period of the minimum K0 and/or the minimum K0 is not applied (e.g., perform default operation) in the period in which the inactivity timer, which is started when receiving an actual PDCCH in DRX operation, is operated.

2. Method 1) Search Space Set Configuration(s) for Power Saving
    Separately configuring a search space set for normal power mode and a search space set for reduced power mode More specifically, when a search space set configuration for power saving operation is instructed and it is determined that the power saving operation is applied (e.g., when a minimum K0 is configured), the UE may apply a corresponding search space set configuration.

In order to increase the power saving gain, the network can be configured to position the monitoring occasion of the (all or part) search space set at the beginning (e.g., first 3 symbol(s)) of each slot in the configuration of the search space set for power saving purposes. The monitoring period of each search space set may be configured to be greater than the minimum K0.

Such a configuration is preferably avoided because it may cause side effects such as increasing blocking between search space sets and increasing monitoring skips due to overlap of different CORESETs in a general situation. However, when power saving is required, it may be desirable to reduce power consumption compared to scheduling flexibility.

For such an operation, the network may indicate the configuration of the search space set in the normal power mode and the configuration the search space set in the reduced power mode for each search space sets (or a specific search space set). The UE may select/apply a search space set configuration according to the power mode. The present specification may be applied only to an active BWP currently operating.

This can also be implemented in a manner in which monitoring is performed only for a specific search space set(s) when a minimum K0 is configured and applied.

For example, if the minimum K0 is configured, the UE may monitor only for a monitoring occasion located within 3 symbol(s) from the start of the slot or may perform monitoring only for a search space set in which the monitoring period is larger than the configured minimum K0.

3. Method 2) PDCCH Monitoring Periodicity Adaptation Depending on Minimum K0
    If the monitoring period of the search space set currently being monitored is less than the minimum K0, increasing the monitoring period of the SS (search space) set.

More specifically, when the PDCCH monitoring period is shorter than the period according to the minimum K0, the power saving gain due to the minimum K0 may be reduced because the PDCCH monitoring is performed in the micro sleep period.

In order to solve such a problem, in the present specification, a minimum K0 value is configured, and when the monitoring period of the currently monitored search space set is shorter than the minimum K0 period, it is proposed to increase the monitoring period.

This may be automatically applied when there is a monitoring occasion due to a monitoring period within a micro sleep period by a minimum K0, and/or it may be implemented by a method of configuring a monitoring period of a related search space set together when configuring the minimum K0 value.

When the monitoring periodicity is implicitly changed by the minimum K0 value, the new monitoring periodicity may be determined by a predetermined rule. (For example, it may be changed to twice the current monitoring periodicity, etc., and this may be interpreted as performing only monitoring for an even-numbered (or odd-numbered) opportunity among the current monitoring occasions.)

4. Method 3) Skip PDCCH Monitoring
    Skip monitoring for another monitoring occasion located within the minimum K0 from the monitoring occasion.

As another method, a method of skipping monitoring for a monitoring occasion located within a micro sleep period by a minimum K0 may be used.

This may be applied to each search space set, or may be applied even when a monitoring occasion of another search space set is located in a micro sleep period (that is, the interval guaranteed that there is no PDSCH transmission by the minimum (minimum) K0) of a specific search space set(s).

As an example, the network may configure a minimum K0 value for a specific search space set, and the network may instruct not only to monitor the search space set, but also to skip monitoring other search space sets within the interval determined by the minimum K0 value from each monitoring occasion of the corresponding search space set.

5. Meanwhile,

The methods for increasing power saving efficiency using cross-slot scheduling proposed above can be applied in the same way even when a duration is applied to the search space set. In the search space set configuration in the specification, "duration" is defined as "a duration of Ts<ks slots indication a number of slots that the search space sets exists by duration", where ks means monitoring periodicity.

That is, it means that the UE monitors the search space set in ks slots per monitoring periodicity for the search space set for which the duration is configured.

Accordingly, when it is necessary to monitor the search space set corresponding to each slot within the duration, the power saving effect due to cross-slot scheduling may be reduced. Therefore, the method(s) proposed above may be applied to a slot within a duration.

For example, when a minimum K0 (for power saving) is configured by the network, when power saving is applied, and/or when the interval between monitoring slots within the duration is less than the minimum K0, the methods 1, 2 and/or 3 proposed above, such as monitoring periodicity adjustment and/or monitoring skip, can be applied to slots within a duration.

<Exceptional Cases of Micro Sleep by Cross-Slot Scheduling>

In actual network coverage, a UE that requires power saving and a UE that does not need it, and/or a UE capable of power saving operation and a UE that is not capable of power saving may exist at the same time.

In this case, the power saving operation for a specific UE group may result in a decrease in overall system performance. In the present specification, in order to reduce the system impact, it is proposed to perform PDSCH buffering regardless of whether the minimum K0 or not in the following cases. (Or, regardless of whether the minimum K0 or not, PDSCH buffering may be performed based on the minimum K0 value (or K0=0) in the configured TDRA table.)

Individually or through a combination, each of the following cases may be defined as an exceptional case(s) for micro sleep (or PDSCH buffering).

Case 1) the case where SI-RNTI is monitored in Type 0 CSS, the UE may perform PDSCH buffering assuming that K0 is 0 regardless of the minimum K0.

Case 2) the case where SI-RNTI, RA-RNTI, TC-RNTI, and P-RNTI are monitored in Type0A CSS, Type1 CSS, Type1 CSS, and Type2 CSS respectively and the case where pdsch-ConfigCommon does not contain pdsch-TimeDomainAllocationList (i.e. the case using the default TDRA table)

Case 3) the case where C-RNTI, MCS-C-RNTI, CS-RNTI are monitored in CSS linked to CORESET other than CORESET #0 or monitored in USS and the case where pdsch-ConfigCommon and/or pdsch-Config does not include pdsch-TimeDomainAllocationList (i.e. when using the default TDRA table)

Case 4) the case where C-RNTI, MCS-C-RNTI, CS-RNTI are monitored in candidates monitoring SI-RNTI, RA-RNTI and/or P-RNTI for the following reasons and the case where the search space set uses the default TDRA table More specifically, the case where the following configurations are provided to the terminal:

One or more search space sets corresponding to one or more 'searchSpaceZero', 'searchSpaceSIB1', 'searchSpaceOtherSystemInformation', 'pagingSearchSpace' and/or 'ra-SearchSpace', and/or C-RNTI, MCS-C-RNTI, or a CS-RNTI, The UE may monitor the PDCCH candidate(s) for DCI format 0_0 and DCI 1_0 with CRC scrambled by C-RNTI, MCS-C-RNTI, or CS-RNTI in one or more search space sets in the slot. Here, the above slot may be a slot in which the UE monitors PDCCH candidate(s) for at least DCI format 0_0 or DCI format 1_0 with CRC scrambled by SI-RNTI, RA-RNTI, or P-RNTI.

Case 5) the case where the K0 value (e.g. K0=0) less than the minimum K0 is included in the TDRA table for the search space set monitoring broadcast (or group common) information (e.g., all or part of SI-RNTI, RA-RNTI, P-RNTI, SFI-RNTI): It means that the PDSCH buffering is performed based on the corresponding K0 value (for example, immediately performed after receiving PDCCH) when there is a case in which K0 (e.g., K0=0) smaller than the minimum K0 is included in the corresponding table even if the default TDRA table is not used and the TDRA table is configured through RRC signaling (e.g., SIB, UE-dedicated signaling).

That is, if a value smaller than the dynamically indicated minimum K0 exists in the TDRA table configured for the corresponding search space set (i.e., a search space set that monitors broadcast (or group common) information), the corresponding value may also be applied.

The exceptional case may be defined for each case listed above, or simply, when the default TDRA table is applied, it may be assumed that the minimum K0 configured by the NW is not applied to the monitoring for the corresponding search space set.

On the other hand, exceptional cases may be defined for each case listed above, or simply, when a default TDRA table (e.g., a table for applicable PDSCH time domain resource allocation) is applied, it may be assumed that the minimum K0 configured by the NW is not applied to the monitoring of the corresponding search space set.

Hereinafter, as an embodiment of the above-described case, a feature in which the minimum K0 is not applied (based on the use of the default TDRA) will be described with reference to the drawings. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 15:
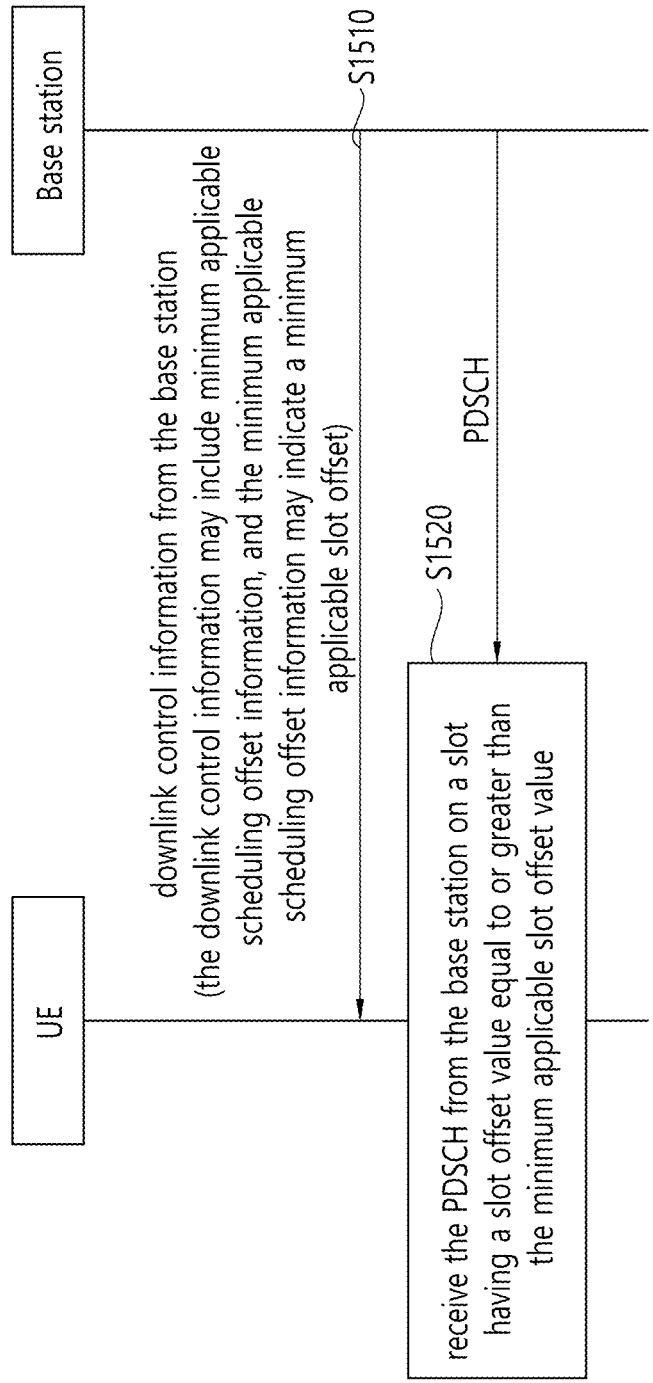
FIG. 15 is a flowchart of a method for receiving a PDSCH based on a default PDSCH time domain resource allocation according to an embodiment of the present specification.

FIG. 15 is a flowchart of a method for receiving a PDSCH based on a default PDSCH time domain resource allocation according to an embodiment of the present specification.

According to FIG. 15, the terminal may receive downlink control information from the base station (S1510). Here, the downlink control information may include minimum applicable scheduling offset information, and the minimum applicable scheduling offset information may indicate a minimum applicable slot offset. In other words, the terminal may receive downlink control information indicating the minimum applicable slot offset.

The minimum applicable slot offset may mean a minimum K0 described later (and described above) and described above (and described later). And, the minimum K0 may be expressed as K0min.

The terminal may receive the PDSCH from the base station on a slot having a slot offset value equal to or greater than the minimum applicable slot offset value (S1520).

In FIG. 15, a basic structure of a PDSCH reception method based on the default PDSCH time domain resource allocation in the present specification has been described. Hereinafter, an example in FIG. 15 will be described in another way through the drawings.

Figure 16:
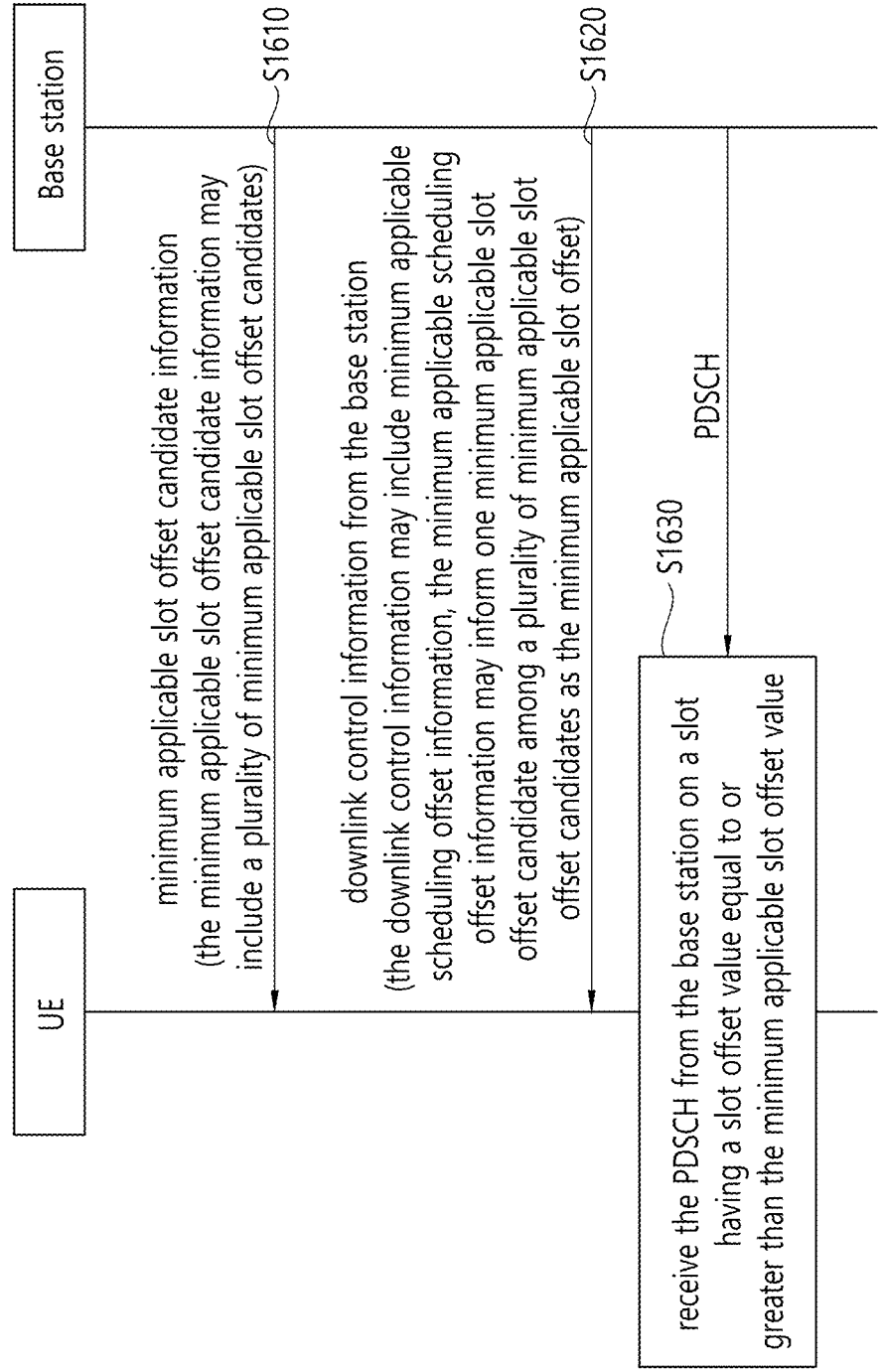
FIG. 16 is a flowchart of a method for receiving a PDSCH based on a default PDSCH time domain resource allocation according to another embodiment of the present specification.

FIG. 16 is a flowchart of a method for receiving a PDSCH based on a default PDSCH time domain resource allocation according to another embodiment of the present specification.

According to FIG. 16, the terminal may receive minimum applicable slot offset candidate information from the base station (S1610).

Here, the minimum applicable slot offset candidate information may include a plurality of minimum applicable slot offset candidates. Here, for example, the minimum applicable slot offset candidate information may be 'minimumSchedulingOffset' to be described later. In other words, for example, the minimum applicable slot offset candidate information may be 'minimumSchedulingOffsetK0' and/or 'minimumSchedulingOffsetK2', which will be described later. Here, the example of the minimum applicable slot offset candidate information is only an example of the present specification. That is, the minimum applicable slot offset candidate information may be implemented by other embodiments of the present specification described above (and/or to be described later).

The terminal may receive downlink control information from the base station (S1620). Here, the downlink control information may include minimum applicable scheduling offset information. Here, the minimum applicable scheduling offset information may inform one minimum applicable slot offset candidate among a plurality of minimum applicable slot offset candidates as the minimum applicable slot offset.

That is, here, for example, the downlink control information may include minimum applicable scheduling offset information indicating a minimum applicable slot offset.

In this case, the minimum applicable scheduling offset information may be 0 bits or 1 bit.

For example, when 'minimumSchedulingOffset (minimum scheduling offset)' corresponding to the upper layer parameter is not configured, the minimum applicable scheduling offset may be 0 bits.

Also, for example, when 'minimumSchedulingOffset' corresponding to an upper layer parameter is configured, the minimum applicable scheduling offset may be 1 bit. In this case, the 1-bit indicator may be used to determine the minimum applicable slot offset (e.g. minimum applicable K0). (On the other hand, this content can also be applied to the minimum applicable K2.)

Here, with respect to 'minimumSchedulingOffset', 'PDSCH-Config' transmitted through RRC signaling may include 'minimumSchedulingOffsetK0', and the 'PUSCH-Config' transmitted through RRC signaling may include 'minimumSchedulingOffsetK2'.

For example, as shown in Table 4 below, 'PDSCH-Config' and 'minimumSchedulingOffsetK0' above may be defined in the following format.

TABLE 4

```
-- ASN1START
-- TAG-PDSCH-CONFIG-START
PDSCH-Config ::=                    SEQUENCE {
......
  [[
  maxMIMO-Layers-r16                INTEGER (1..8)
OPTIONAL, -- Need M
  minimumSchedulingOffsetK0-r16     SetupRelease
{ MinSchedulingOffsetK0-Values-r16 }     OPTIONAL -- Need M
  ]]
......
MinSchedulingOffsetK0-Values-r16 ::=   SEQUENCE (SIZE
(1..maxNrOfMinSchedulingOffsetValues-r16)) OF INTEGER (0..maxK0-
SchedulingOffset-r16)
-- TAG-PDSCH-CONFIG-STOP
-- ASN1STOP
```

Here, 'minimumSchedulingOffsetK0' may mean a list of minimum K0 values. Here, the minimum K0 parameter may represent the minimum applicable value(s) for the TDRA table for the PDSCH (and/or the A-CSI RS triggering offset). The minimum applicable K0 and/or the minimum applicable K2 may be indicated based on the table below. Table 5 below is a table of joint indications of the minimum applicable scheduling offset K0/K2.

TABLE 5

| Bit field mapped to index | When 'minimumSchedulingOffset' is configured for DL BWP, minimum applicable K0 for active DL BWP | When 'minimumSchedulingOffset' is configured for UL BWP, minimum applicable K2 for active UL BWP |
| --- | --- | --- |
| 0 | First value configured by 'minimumSchedulingOffset' for the active DL BWP | First value configured by 'minimumSchedulingOffset' for the active UL BWP |
| 1 | The second value configured by 'minimumSchedulingOffset' for the active DL BWP when the second value is set; otherwise, 0 | The second value configured by 'minimumSchedulingOffset' for the active UL BWP when the second value is set; otherwise, 0 |

Here, the minimum applicable slot offset may be a slot offset related to expecting the UE to receive the PDSCH based on at least one slot offset having a value greater than or equal to the minimum applicable slot offset. (That is, the UE may receive the PDSCH based on a slot offset having a value greater than or equal to the minimum applicable slot offset.) In other words, the minimum applicable slot offset may be a slot offset related to the UE not expecting to receive the PDSCH based on at least one slot offset having a value smaller than the minimum applicable slot offset. (That is, the terminal may not receive the PDSCH based on a slot offset having a value smaller than the minimum applicable slot offset.) In this case, the minimum applicable slot offset may mean a minimum K0 described above (and will be described later). And, the minimum K0 may be expressed as K0min.

In other words, S1620 may be described as a different expression, (via downlink control information (DCI)), the UE may receive an indication of the minimum applicable K0 (in other words, the minimum applicable K0 value) from the base station. Here, for example, one or two minimum applicable K0 candidate values are indicated by RRC, and the minimum applicable K0 value to be actually applied is determined by DCI. And, a new minimum applicable K0 value may be applied from a slot in which an application delay has passed since the DCI is received.

The terminal may receive the PDSCH from the base station on a slot having a slot offset value equal to or greater than the minimum applicable slot offset value (S1630). Here, when the UE receives the PDSCH, it is not necessary to apply the previously received minimum applicable slot offset.

Returning to FIG. 15 again, for example, the terminal may not apply the minimum applicable slot offset based on the default PDSCH time domain resource allocation being used.

More specifically, based on a default PDSCH time domain resource allocation being used and a PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0, the UE may not apply the minimum applicable slot offset.

Or, for example, based on a default PDSCH time domain resource allocation being used and a PDSCH transmission being scheduled with a cell-radio network temporary identifier (C-RNTI), a configured scheduling-RNTI (CS-RNTI) or a modulation and coding scheme-cell-RNTI (MCS-C-RNTI) in a UE specific search space (USS) and a common search space associated with a control resource set (CORESET) except for a CORESET 0, the UE may not apply the minimum applicable slot offset.

Here, for example, the UE may receive the PDSCH based on the default PDSCH time domain resource allocation without applying the minimum applicable slot offset. In this case, the terminal may receive the PDSCH based on the slot offset defined in the default PDSCH time domain resource allocation (e.g., default PDSCH time domain resource allocation in Tables 6 to 10 to be described later, etc.). Meanwhile, the terminal may receive the PDSCH after a slot has passed by the value of the slot offset from the slot in which the DCI is received.

As an example, when the minimum applicable slot offset is applied, the terminal may not expect to receive the PDSCH based on a slot offset having a value smaller than a value of a minimum applicable slot offset.

As an example, the terminal receives minimum scheduling offset information from the base station, the minimum applicable scheduling offset information may be information indicating one of values in the minimum scheduling offset information as the minimum applicable slot offset value. Here, the terminal may receive the minimum scheduling offset information based on higher layer signaling.

For example, the downlink control information is DCI format 1_1, and the DCI format 1_1 may be used for scheduling the PDSCH.

Summarizing the above and describing it differently, the terminal may receive the downlink control information from the base station. The terminal may receive a physical downlink shared channel (PDSCH) from the base station based on the downlink control information. Here, the downlink control information may include minimum applicable scheduling offset information indicating a minimum applicable slot offset. In addition, here, the minimum applicable slot offset may be an offset related to the UE not expecting to receive the PDSCH based on a slot offset having a value greater than or equal to the minimum applicable slot offset.

The content of FIG. 15 may be described in another way as follows.

The exceptional cases 1, 2, 3, and 4 proposed above can be defined using the table of the existing specification. The table below may be included in the specification, and it defines whether to assume the default TDRA table or the RRC signaled TDRA table for the RNTI and the search space set in which the corresponding RNTI is monitored. Therefore, when defining cases 1, 2, 3, 4 as exceptional cases, it is proposed to assume that there is no buffering skip by the minimum K0 indicated for cross-slot scheduling in the combination of an RNTI and a search space (SS) set corresponding to the highlighted area of the table below.

In other words, it is suggested that "The adaptation on the minimum applicable value of K0" indicated by the network is not applied in the case indicated in the table below (i.e., the case specified to use the default TDRA table in Table 5 below). (Or, some of the cases highlighted in the table below can be defined as exceptional cases)

Table 6 below corresponds to an example of the applicable PDSCH time domain resource allocation.

TABLE 6

| RNTI | PDCCH search space | SS/PBCH block and CORESET multiplexing pattern | pdsch-ConfigCommon contains pdsch-TimeDomainAl-locationList | pdsch-Config contains pdsch-TimeDomainAl-locationList | PDSCH Time domain resource allocation to apply |
|---|---|---|---|---|---|
| SI-RNTI | Type 0 common | 1 | — | — | Default A for normal CP |
|  |  | 2 | — | — | Default B |
|  |  | 3 | — | — | Default C |

TABLE 6-continued

| RNTI | PDCCH search space | SS/PBCH block and CORESET multiplexing pattern | pdsch-ConfigCommon contains pdsch-TimeDomainAllocationList | pdsch-Config contains pdsch-TimeDomainAllocationList | PDSCH Time domain resource allocation to apply |
|---|---|---|---|---|---|
| SI-RNTI | Type 0A common | 1 | No | — | Default A |
|  |  | 2 | No | — | Default B |
|  |  | 3 | No | — | Default C |
|  |  | 1, 2, 3 | Yes | — | pdsch-TimeDomainAllocationList provided in pdsch-ConfigCommon |
| RA-RNTI, MsgB-RNTI, TC-RNTI | Type 1 common | 1, 2, 3 | No | — | Default A |
|  |  | 1, 2, 3 | Yes | — | pdsch-TimeDomainAllocationList provided in pdsch-ConfigCommon |
| P-RNTI | Type 2 common | 1 | No | — | Default A |
|  |  | 2 | No | — | Default B |
|  |  | 3 | No | — | Default C |
|  |  | 1, 2, 3 | Yes | — | pdsch-TimeDomainAllocationList provided in pdsch-ConfigCommon |
| C-RNTI, MCS-C-RNTI, CS-RNTI | Any common search space related to CORESET 0 | 1, 2, 3 | No | — | Default A |
|  |  | 1, 2, 3 | Yes | — | pdsch-TimeDomainAllocationList provided in pdsch-ConfigCommon |
| C-RNTI, MCS-C-RNTI, CS-RNTI | Any common search space not related to CORESET 0 UE specific search space | 1, 2, 3 | No | No | Default A |
|  |  | 1, 2, 3 | Yes | No | pdsch-TimeDomainAllocationList provided in pdsch-ConfigCommon |
|  |  | 1, 2, 3 | No/Yes | Yes | pdsch-TimeDomainAllocationList provided in pdsch-Config |

That is, as an example in Table 6, in a common search space associated with CORESET (control resource set) 0, based on the PDSCH transmission being scheduled with cell-radio network temporary identifier (C-RNTI), configured scheduling-RNTI (CS-RNTI) or MCS-C-RNTI (modulation and coding scheme-cell-RNTI), and based on the default PDSCH time domain resource allocation being used (e.g., default A in Table 6), the terminal may not apply the minimum applicable slot offset. In addition, for example, in a UE specific search space (USS) and a common search space associated with a CORESET other than CORESET (control resource set) 0, based on the PDSCH transmission being scheduled with a cell-radio network temporary identifier (C-RNTI), configured scheduling-RNTI (CS-RNTI) or modulation and coding scheme-cell-RNTI (MCS-C-RNTI), and based on the default PDSCH time domain resource allocation being used (e.g., default A in Table 6), the terminal may not apply the minimum applicable slot offset.

In other words, if the default TDRA table is applied, adaptation for the minimum applicable value of K0 may not be applied to C/CS/MCS-RNTI monitored in the common search space (of type 0/0A/1/2) associated with CORESET 0.

Meanwhile, the applicable PDSCH time domain resource allocation in Table 6 may be an applicable PDSCH time domain resource allocation related to DCI format 1_0 and DCI format 1_1. Here, the contents of the default A, the default B, and the default C in Table 6 may be the same as in Tables 7 to 10 below.

The following Table 7 is an example of a default PDSCH time domain resource allocation A (i.e., default A) for a normal CP.

TABLE 7

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |

TABLE 7-continued

| Row index | dmrs-TypeA-Position | PDSCH mapping type | K₀ | S | L |
|---|---|---|---|---|---|
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

The following Table 8 is an example of the default PDSCH time domain resource allocation A (i.e., default A) for the extended CP.

TABLE 8

| Row index | dmrs-TypeA-Position | PDSCH mapping type | K₀ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

The following Table 9 is an example of the default PDSCH time domain resource allocation B (i.e., default B).

TABLE 9

| Row index | dmrs-TypeA-Position | PDSCH mapping type | K₀ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|   | 3 | Type A | 0 | 3 | 11 |
| 15 | 2, 3 | Type B | 1 | 2 | 4 |
| 16 |   | Reserved |   |   |   |

In the part indicated by note 1 in Table 9, when the PDSCH is scheduled as SI-RNTI in the PDCCH type 0 common search space, the UE may assume that this PDSCH resource allocation is not applied. Table 10 below is an example of the default PDSCH time domain resource allocation C (i.e., default C).

TABLE 10

| Row index | dmrs-TypeA-Position | PDSCH mapping type | K₀ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |   | Reserved |   |   |   |
| 7 |   | Reserved |   |   |   |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|   | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

In the part indicated by Note 1 in Table 10, when the PDSCH is scheduled as SI-RNTI in the PDCCH type 0 common search space, the UE may assume that this PDSCH resource allocation is not used. Alternatively, for type 0, 0A, 1, 2 CSS that monitors SI-, P-, and RA-RNTI specified in the table above, it may be assumed that the cross-slot based power saving scheme based on the minimum K0 is not applied.

Regarding C-RNTI, assuming that the cross-slot based power saving scheme by minimum K0 is not applied to the C-RNTI monitored together with SI-, RA-, P-RNTI in Types 0, 0A, 1 and 2 mentioned above, and/or it may be assumed that a cross-slot-based power saving scheme based on a minimum K0 is applied in the remaining types of CSS and USS. Here, that the cross-slot-based power saving scheme based on the minimum K0 is applied means a minimum K0 configuration, or whether buffering is performed according to the minimum K0.

<Search Space Set Specific Minimum K0>

As in the exceptional case suggested above, there may be a case where it is difficult to save power by the minimum K0. Another way to solve this, a method is proposed in which a network designates a search space set to which a minimum K0 is applied, or a search space set (or CORESET) to which a minimum K0 is applied by a predefined definition.

For example, the PDSCH buffering skip by the minimum K0 can be applied only to a specific search space type (e.g., CSS/USS) (or search space set (CORESET) of a specific index).

For example, the minimum K0 can be applied only to the USS. In the case of CSS, a plurality of UEs may perform monitoring for the corresponding CSS, and among the corresponding UEs, UE(s) that do not need power saving or cannot perform power saving operation may be included. Therefore, for CSS, the minimum K0 additionally signaled by the network may not be applied.

When the minimum K0 is configured as BWP specific, a set of search spaces to which the minimum K0 is not applied may be defined in advance or indicated by the network. For example, when the exceptional case(s) proposed in the present specification exists in a specific BWP, it may be defined in advance that the minimum K0 is not applied to the case(s).

Similarly, whether to apply a minimum K0 may be determined according to a service type. For example, in the case of a URLLC service, a plurality of monitoring opportunities for the same search space set within a slot may be configured to reduce latency. In this case, a power saving scheme using cross-slot scheduling may be inappropriate.

Accordingly, a service type to which a minimum K0 and a PDSCH buffering skipping is applied (or not applied) may be determined according to a predefined definition in the specification or an indication of a network. This may be classified by a DCI format or the like. That is, if the DCI format (e.g., compact DCI) for URLLC is separately defined, the minimum K0 may not be applied to the search space set monitoring the corresponding DCI format (or for candidates monitoring the DCI format).

<Minimum K0 and Buffering Skip>

The minimum K0 and whether to buffer may be independently determined.

For example, different search space sets monitored in the same slot may have different minimums K0. For example, for SI-RNTI monitored in CSS of a specific slot, pdsch-TimeDomainAllocationList provided in pdsch-ConfigCommon is not signaled, so the minimum K0 is 0 assuming a default TDRA table. With respect to the C-RNTI monitored in the USS of the same slot, the pdsch-TimeDomainAllocationList provided in pdsch-Config and the minimum K0 are signaled, and the signaled minimum K0 may be applied.

That is, a minimum K0 may assume different values for each RNTI and/or search space set. In this case, whether to buffer or not (or whether "The adaptation on the minimum applicable value of K0") may be determined based on the smallest value among different minimum KOs in the corresponding slot.

For example, if SI-RNTI and C-RNTI are monitored in different search space sets in the same slot as above and the minimum K0 is different from each other (e.g., SI-RNTI→0, C-RNTI→2), whether to perform buffering (or whether "The adaptation on the minimum applicable value of K0") may be determined based on the smallest minimum K0 (e.g., SI-RNTI→0). That is, when the minimum K0 for each SS set (RNTI in the example below) monitored in the same slot is different, a minimum value may be applied.

As another example, different minimum KOs may be assumed for each RNTI in the same search space set. For example, if the DCI scrambling with SI-RNTI and C-RNTI in CSS not linked to CORESET #0 is monitored and the TDRA table is configured by pdsch-TimeDomainAllocationList provided in pdsch-Config, and if pdsch-TimeDomainAllocationList provided in pdsch-Config is not configured, SI-RNTI assumes a default TDRA table and C-RNTI follows the TDRA table given by RRC signaling.

In this case, when a minimum K0 for power saving is indicated, the SI-RNTI cannot assume a corresponding minimum K0, and the C-RNTI can assume a corresponding minimum K0. That is, in the same search space set, a minimum K0 to be assumed according to the RNTI may be differently configured.

In this situation, the UE should determine whether to buffer by assuming a smaller value among the minimum K0 for each RNTI. In the case of an example, when the minimum K0 in the default TDRA table is 0, and the minimum K0 to be applied to the C-RNTI is 2, which is indicated by the network (for power saving), the UE may determine whether to buffer based on 0 which is a smaller value.

In addition, even if the minimum K0 for power saving is greater than 0, when buffering needs to be performed in the corresponding slot (because there is an RNTI with a minimum K0 of 0 or search space set), even in the RNTI and/or search space set to which the minimum K0 (for power saving) configured by the network is applied, it can be assumed that the minimum K0 is 0.

This is even if the network configures the minimum K0 (for power saving) greater than 0, when the UE assumes a minimum K0 of 0 in a specific slot, the network may mean that the same slot scheduling is possible for a search space set and/or an RNTI that may assume a minimum K0 greater than 0. When operating in this way, the network has the advantage of avoiding scheduling restrictions such as delay, which may occur due to cross-slot scheduling, in the corresponding slot.

This specification may be expressed as follows. When there are multiple search space sets monitored by the terminal in a specific slot, or when monitoring PDCCH candidates for multiple RNTIs even within the same search space set, with regard to the terminal, for the minimum number of TDRA K0 in the corresponding slot and/or the minimum number of slots up to the CSI-RS for CSI measurement indicated by the corresponding PDCCH and/or K2, the minimum K0 value of TDRA (e.g. default and/or common and/or terminal-specific configured TDRA) in the corresponding slot may be applied as an exception.

<Optimization of Cross-Slot Scheduling Based Power Saving>

The cross-slot scheduling and power saving scheme using the minimum K0 proposed above can obtain an additional power saving gain through the following method.

The search space set configured to monitor SI-RNTI, P-RNTI, and RA-RNTI includes time domain resource information for monitoring the corresponding search space set using monitoring periodicity, offset, and the like.

On the other hand, the RNTI does not need to perform monitoring at every monitoring occasion. For example, whether or not to monitor each information may be determined by the following information.

—RACH

In response to the PRACH transmission, the UE may attempt to detect DCI format 1_0 having a CRC scrambled by a corresponding RA-RNTI during a window controlled by a higher layer.

The window above starts at the first symbol of the fastest CORESET, the terminal may be configured to receive the PDCCH for the Type 1-PDCCH CSS set which is at least one symbol after the last symbol of a PRACH occasion corresponding to PRACH transmission. Here, the symbol duration may correspond to the SCS of the Type 1-PDCCH CSS set.

The window length of the number of slots based on the SCS of the Type 1-PDCCH CSS set may be provided by ra-Response Window.

In other words, the (terminal) starts the ra-ResponseWindow composed of RACH-ConfigCommon at the first PDCCH occasion from the end of the random access preamble transmission. (The terminal) may monitor the PDCCH of the SpCell for the random access response(s) identified as RA-RNTI while the ra-ResponseWindow is running.

—Paging

In RRC_IDLE or RRC_INACTIVE, the UE may monitor the SI change indication at its own paging occasion every DRX cycle.

When a common search space is provided to the active BWP in order to monitor paging to the terminal, the terminal in RRC_CONNECTED may monitor the SI change indication at a paging occasion at least once every modification period.

The ETWS or CMAS capable terminal in RRC_IDLE or RRC_INACTIVE may monitor the indication for PWS notification in its own paging occasion every DRX cycle.

When a common search space on an active BWP is provided to the terminal to monitor paging, the ETWS or CMAS capable terminal in RRC_CONNECTED may monitor the indication for PWS notification on a paging occasion at least once every default paging cycle.

—SI Update

For example, when selecting a cell (e.g., when power is supplied), when reselecting a cell, when returning from outside coverage, after reconfiguration to complete synchronization, immediately after receiving an indication that system information has changed, after entering the network from another RAT, immediately after receiving the PWS notification and/or whenever the terminal does not have a valid version of the stored SIB, the UE may need to apply the SI acquisition procedure.

Meanwhile, according to the above, it is possible to determine whether to monitor RACH, paging, SI update, etc. according to a specific window and a specific condition, this may mean that it is not necessary to monitor the RNTI in all monitoring occasions configured in the search space set configuration.

Therefore, in the present specification, it is proposed that the minimum K0 (for power saving) indicated by the network is applied in the section excluding the monitoring section defined in the spec.

For example, if SI-RNTI and C-RNTI are monitored in the same search space set among the above-described embodiments, and the minimum K0 for each RNTI is different, it can be assumed that the minimum K0 of SI-RNTI is valid only within the interval defined in the above specification in the example that the smallest minimum K0 is applied.

That is, the interval for monitoring the actual SI-RNTI among the monitoring occasions of the search space set is determined by the definition of the specification, and the minimum K0 applied to the C-RNTI may be applied in the remaining monitoring occasions. Through this, the UE can obtain additional power saving gain through no buffering or the like.

<Error Handling for PS-PDCCH Misdetection>

Cross-slot scheduling using minimum K0/K2 is a method of reducing power consumption by not performing PDSCH buffering in the interval guaranteed by the minimum K0/K2 and/or slowly performing processing required for PDCCH decoding (e.g., using low voltage/low clock speed, etc.). In this case, the minimum K0/K2 may be configured using a PS-PDCCH or the like.

In this case, if the PS-PDCCH indicating the minimum K0/K2 cannot be detected or misinterpreted due to a false-alarm, etc., the UE may perform a malfunction such as failing to perform buffering for a period in which the PDSCH is transmitted, and/or if the malfunction is prolonged, the throughput of the UE can be greatly reduced. In this specification, a fallback operation is proposed to solve such a problem.

—Detection of Missing/False Alarm

The criterion for determining whether the UE has a missed/false alert for the indicated minimum K0/K2 may be a case that satisfies all or part of the following conditions.

1. A case that the network indicates a value smaller than the minimum K0/K2 (instructed in advance by the network) in the time domain resource allocation field in the DCI transmitted for PDSCH scheduling A. For example, when the minimum K0/K2 is indicated as 2, but K0/K2 corresponding to 0 or 1 is indicated in DCI scheduling the PDSCH 2. A case that the PDCCH is not found at the monitoring occasion for the PS-PDCCH (or the PDCCH/PDSCH including the corresponding information) indicating the minimum K0/K2 and/or a case that a value smaller than the minimum K0/K2 known by the UE is indicated by the DCI which is received after the corresponding point in time and schedules the PDSCH A. That is, when the above condition is satisfied in the DCI detected within a certain time from the PS-PDCCH monitoring occasion, it may be assumed that the PS-PDCCH is missing or a false alarm.

3. A case that PDCCH/PDSCH reception was performed by applying the corresponding value after receiving the minimum K0/K2 but PDSCH decoding fails more than X times (but PDCCH decoding was successful)

A. For example, if the PDCCH decoding succeeds, but the PDSCH/PUCCH/PUSCH transmission/reception with the minimum K0/K2 applied fails X (here, X may be defined in advance or may be indicated through higher layer signaling of the network) times or more, the UE may assume that the PS-PDCCH indicating the minimum K0/K2 has been missed or that the corresponding decoding is a false alarm.

4. When, among the rows of the TDRA table, one or more rows that can be applied only in the normal mode and/or in the power saving mode are indicated to the UE by predefined or through higher layer signaling of the network, and if a row of the opposite mode is detected in DCI in each mode, it can be assumed that the PS-PDCCH is a missed or false alarm.

A. In this case, condition 2 above may be additionally considered. That is, when the above condition is satisfied in the DCI detected within a certain time from the PS-PDCCH monitoring occasion, it may be assumed that the PS-PDCCH is missing or a false alarm.

—Fallback Behavior

When the UE detects a missed or false alarm for the minimum K0/K2 indication by the method proposed above, it may perform a fallback operation as follows. The fallback operation may be performed through one of the following methods or a combination of the methods proposed below.

1. The buffering operation can be performed assuming the minimum K0/K2 in the current TDRA table, here, this may be a useful method when distinguishing a row available in one TDRA table by a minimum K0/K2.

2. Alternatively, the minimum K0/K2 can be assumed to be a pre-defined value.

A. For example, a minimum K0/K2 value for fallback indicated by higher layer signaling of the network (or predefined in the specification) may be applied in the fallback operation.

For example, the exemplary embodiments of the present specification described so far may be described again from the viewpoint of the terminal as follows.

Figure 17:
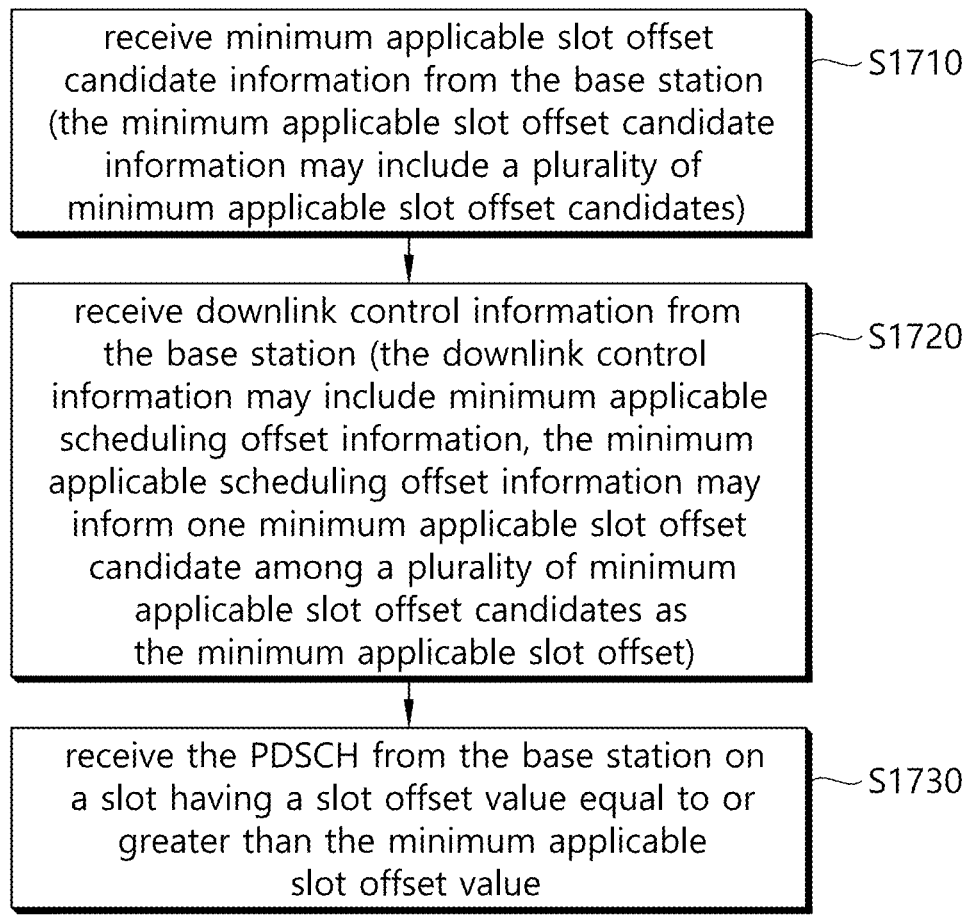
FIG. 17 is a flowchart of a method for receiving a PDSCH based on a default PDSCH time domain resource allocation from a terminal perspective according to an embodiment of the present specification.

FIG. 17 is a flowchart of a method for receiving a PDSCH based on a default PDSCH time domain resource allocation from a terminal perspective according to an embodiment of the present specification.

According to FIG. 17, the terminal may receive minimum applicable slot offset candidate information from the base station (S1710).

Here, the minimum applicable slot offset candidate information may include a plurality of minimum applicable slot offset candidates.

The terminal may receive downlink control information from the base station (S1720). Here, the downlink control information may include minimum applicable scheduling offset information. Here, the minimum applicable scheduling offset information may inform one minimum applicable slot offset candidate among a plurality of minimum applicable slot offset candidates as the minimum applicable slot offset.

The terminal may receive the PDSCH from the base station on a slot having a slot offset value equal to or greater than the minimum applicable slot offset value (S1730).

Here, as described above, the downlink control information includes minimum applicable scheduling offset information indicating a minimum applicable slot offset, and the minimum applicable slot offset is a slot offset related to expecting the terminal to receive the PDSCH based on at least one slot offset having a value greater than or equal to the minimum applicable slot offset.

For example, the UE may not apply the minimum applicable slot offset based on a default PDSCH time domain resource allocation being used.

Here, for example, based on a default PDSCH time domain resource allocation being used and a PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0, the UE may not apply the minimum applicable slot offset. Also, for example, the UE may receive the PDSCH based on the default PDSCH time domain resource allocation. Also, for example, the UE may receive the PDSCH based on a slot offset defined in the default PDSCH time domain resource allocation. Also, for example, the UE may receive the PDSCH after a slot has passed by a value of the slot offset from a slot on which the downlink control information is received.

For example, if the minimum applicable slot offset is applied, the UE may not expect to receive the PDSCH based on a slot offset having a value smaller than the value of the minimum applicable slot offset.

For example, the terminal receives minimum scheduling offset information from the base station, the minimum applicable scheduling offset information may be information indicating one of values in the minimum scheduling offset information as the minimum applicable slot offset value.

Here, for example, the terminal may receive the minimum scheduling offset information based on higher layer signaling.

For example, the downlink control information may be a downlink control information (DCI) format 1_1, the DCI format 1_1 may be used for scheduling the PDSCH.

Since specific examples of the above embodiments are the same as described above, in order to avoid unnecessary repetition, descriptions of overlapping contents will be omitted.

Figure 18:
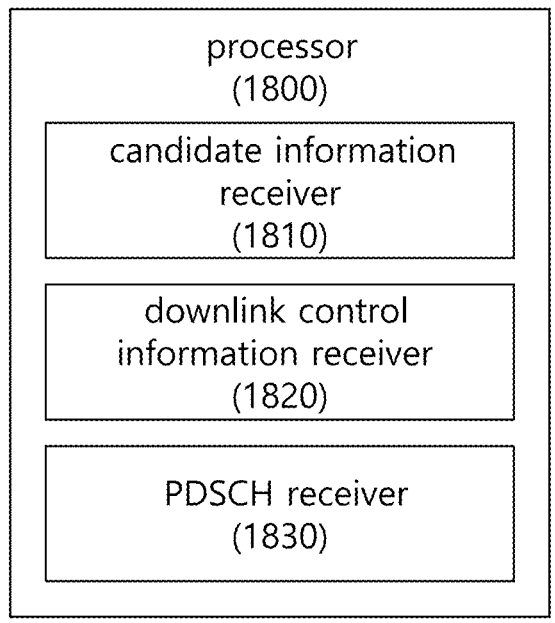
FIG. 18 is a block diagram of an apparatus for receiving a PDSCH based on a default PDSCH time domain resource allocation from a terminal perspective according to an embodiment of the present specification.

FIG. 18 is a block diagram of an apparatus for receiving a PDSCH based on a default PDSCH time domain resource allocation from a terminal perspective according to an embodiment of the present specification.

Referring to FIG. 18, the processor 1800 may include a candidate information receiver 1810, a downlink control information receiver 1820, and a PDSCH receiver 1830. Here, the processor may correspond to the processor of FIGS. 21 to 27.

The candidate information receiver 1810 may be configured to receive minimum applicable slot offset candidate information from the base station. Here, the minimum applicable slot offset candidate information may include a plurality of minimum applicable slot offset candidates.

The downlink control information receiver 1820 may be configured to receive downlink control information from the base station. Here, the downlink control information may include minimum applicable scheduling offset information. Here, the minimum applicable scheduling offset information may inform one minimum applicable slot offset candidate among a plurality of minimum applicable slot offset candidates as the minimum applicable slot offset.

The PDSCH receiver 1830 may be configured to receive the PDSCH from the base station on a slot having a slot offset value equal to or greater than the minimum applicable slot offset value.

Here, as described above, the downlink control information includes minimum applicable scheduling offset information indicating a minimum applicable slot offset, and the minimum applicable slot offset is a slot offset related to expecting the terminal to receive the PDSCH based on at least one slot offset having a value greater than or equal to the minimum applicable slot offset.

For example, the UE may not apply the minimum applicable slot offset based on a default PDSCH time domain resource allocation being used.

Here, for example, based on a default PDSCH time domain resource allocation being used and a PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0, the UE may not apply the minimum applicable slot offset. Also, for example, the UE may receive the PDSCH based on the default PDSCH time domain resource allocation. Also, for example, the UE may receive the PDSCH based on a slot offset defined in the default PDSCH time domain resource allocation. Also, for example, the UE may receive the PDSCH after a slot has passed by a value of the slot offset from a slot on which the downlink control information is received.

For example, if the minimum applicable slot offset is applied, the UE may not expect to receive the PDSCH based on a slot offset having a value smaller than the value of the minimum applicable slot offset.

For example, the terminal receives minimum scheduling offset information from the base station, the minimum applicable scheduling offset information may be information indicating one of values in the minimum scheduling offset information as the minimum applicable slot offset value.

Here, for example, the terminal may receive the minimum scheduling offset information based on higher layer signaling.

For example, the downlink control information may be a downlink control information (DCI) format 1_1, the DCI format 1_1 may be used for scheduling the PDSCH.

This example may be implemented as a chipset and/or a recording medium.

For example, an apparatus comprises at least one memory and at least one processor being operatively connected to the at least one memory, here, the processor is configured to control a transceiver to receive, from a base station, downlink control information, the downlink control information includes minimum applicable scheduling offset information, the minimum applicable scheduling offset information informs a minimum applicable slot offset, and control the transceiver to receive, from the base station, a physical downlink shared channel (PDSCH) on a slot having a value of a slot offset equal to or greater than a value of the minimum applicable slot offset.

As another example, at least one computer readable medium (CRM) includes instructions being executed by at least one processor, here, the at least one processor is configured to control a transceiver to receive, from a base station, downlink control information, the downlink control information includes minimum applicable scheduling offset information, the minimum applicable scheduling offset information informs a minimum applicable slot offset, and control the transceiver to receive, from the base station, a physical downlink shared channel (PDSCH) on a slot having a value of a slot offset equal to or greater than a value of the minimum applicable slot offset.

Since specific examples of the above embodiments are the same as described above, in order to avoid unnecessary repetition, descriptions of overlapping contents will be omitted.

The example of the embodiments of the present specification described so far may be described again from the viewpoint of the base station as follows.

Figure 19:
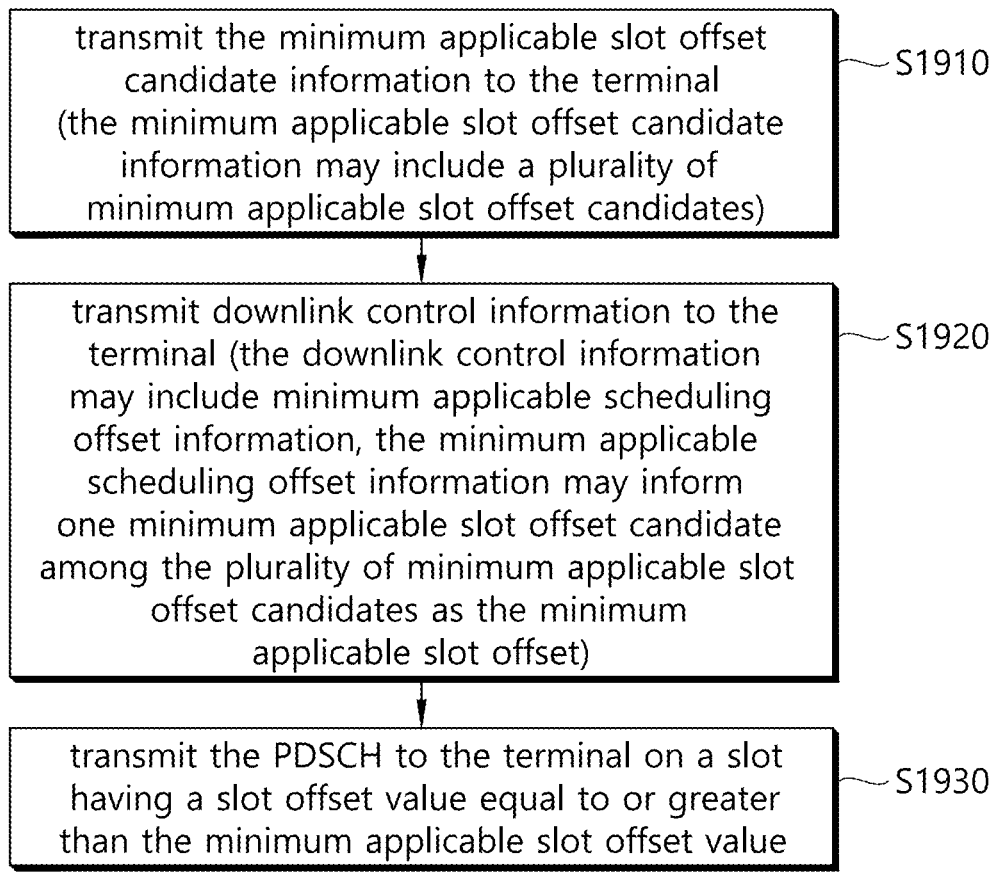
FIG. 19 is a flowchart of a method for transmitting a PDSCH based on default PDSCH time domain resource allocation from a base station perspective according to an embodiment of the present specification.

FIG. 19 is a flowchart of a method for transmitting a PDSCH based on default PDSCH time domain resource allocation from a base station perspective according to an embodiment of the present specification.

FIG. 19, the base station may transmit the minimum applicable slot offset candidate information to the terminal (S1910). Here, the minimum applicable slot offset candidate information may include a plurality of minimum applicable slot offset candidates.

The base station may transmit downlink control information to the terminal (S1920). Here, the downlink control information may include minimum applicable scheduling offset information. Here, the minimum applicable scheduling offset information may inform one minimum applicable slot offset candidate among the plurality of minimum applicable slot offset candidates as the minimum applicable slot offset.

The base station may transmit the PDSCH to the terminal on a slot having a slot offset value equal to or greater than the minimum applicable slot offset value (S1930).

Here, as described above, the downlink control information includes minimum applicable scheduling offset information indicating a minimum applicable slot offset, and the minimum applicable slot offset is a slot offset related to expecting the terminal to receive the PDSCH based on at least one slot offset having a value greater than or equal to the minimum applicable slot offset.

For example, the UE may not apply the minimum applicable slot offset based on a default PDSCH time domain resource allocation being used.

Here, for example, based on a default PDSCH time domain resource allocation being used and a PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0, the UE may not apply the minimum applicable slot offset. Also, for example, the UE may receive the PDSCH based on the default PDSCH time domain resource allocation. Also, for example, the UE may receive the PDSCH based on a slot offset defined in the default PDSCH time domain resource allocation. Also, for example, the UE may receive the PDSCH after a slot has passed by a value of the slot offset from a slot on which the downlink control information is received.

For example, if the minimum applicable slot offset is applied, the UE may not expect to receive the PDSCH based on a slot offset having a value smaller than the value of the minimum applicable slot offset.

For example, the terminal receives minimum scheduling offset information from the base station, the minimum applicable scheduling offset information may be information indicating one of values in the minimum scheduling offset information as the minimum applicable slot offset value.

Here, for example, the terminal may receive the minimum scheduling offset information based on higher layer signaling.

For example, the downlink control information may be a downlink control information (DCI) format 1_1, the DCI format 1_1 may be used for scheduling the PDSCH.

Since specific examples of the above embodiments are the same as described above, in order to avoid unnecessary repetition, descriptions of overlapping contents will be omitted.

Figure 20:
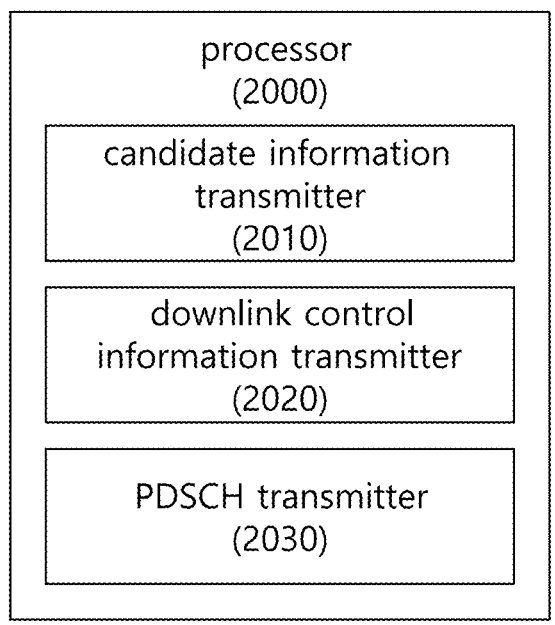
FIG. 20 is a block diagram of a PDSCH transmission apparatus based on default PDSCH time domain resource allocation from a base station perspective according to an embodiment of the present specification.

FIG. 20 is a block diagram of a PDSCH transmission apparatus based on default PDSCH time domain resource allocation from a base station perspective according to an embodiment of the present specification.

Referring to FIG. 20, the processor 2000 may include a candidate information transmission unit 2010, a downlink control information transmission unit 2020, and a PDSCH transmission unit 2030. Here, the processor may correspond to the processor of FIGS. 21 to 27.

The candidate information transmission unit 2010 may be configured to transmit the minimum applicable slot offset candidate information to the terminal. Here, the minimum applicable slot offset candidate information may include a plurality of minimum applicable slot offset candidates.

The downlink control information transmission unit 2020 may be configured to transmit downlink control information to the terminal. Here, the downlink control information may include minimum applicable scheduling offset information. Here, the minimum applicable scheduling offset information may inform one minimum applicable slot offset candidate among the plurality of minimum applicable slot offset candidates as the minimum applicable slot offset.

The PDSCH transmission unit 2030 may be configured to transmit the PDSCH to the terminal on a slot having a slot offset value equal to or greater than the minimum applicable slot offset value.

Here, as described above, the downlink control information includes minimum applicable scheduling offset information indicating a minimum applicable slot offset, and the minimum applicable slot offset is a slot offset related to expecting the terminal to receive the PDSCH based on at least one slot offset having a value greater than or equal to the minimum applicable slot offset.

For example, the UE may not apply the minimum applicable slot offset based on a default PDSCH time domain resource allocation being used.

Here, for example, based on a default PDSCH time domain resource allocation being used and a PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0, the UE may not apply the minimum applicable slot offset. Also, for example, the UE may receive the PDSCH based on the default PDSCH time domain resource allocation. Also, for example, the UE may receive the PDSCH based on a slot offset defined in the default PDSCH time domain resource allocation. Also, for example, the UE may receive the PDSCH after a slot has passed by a value of the slot offset from a slot on which the downlink control information is received.

For example, if the minimum applicable slot offset is applied, the UE may not expect to receive the PDSCH based on a slot offset having a value smaller than the value of the minimum applicable slot offset.

For example, the terminal receives minimum scheduling offset information from the base station, the minimum applicable scheduling offset information may be information indicating one of values in the minimum scheduling offset information as the minimum applicable slot offset value.

Here, for example, the terminal may receive the minimum scheduling offset information based on higher layer signaling.

For example, the downlink control information may be a downlink control information (DCI) format 1_1, the DCI format 1_1 may be used for scheduling the PDSCH.

Since specific examples of the above embodiments are the same as described above, in order to avoid unnecessary repetition, descriptions of overlapping contents will be omitted.

Figure 21:
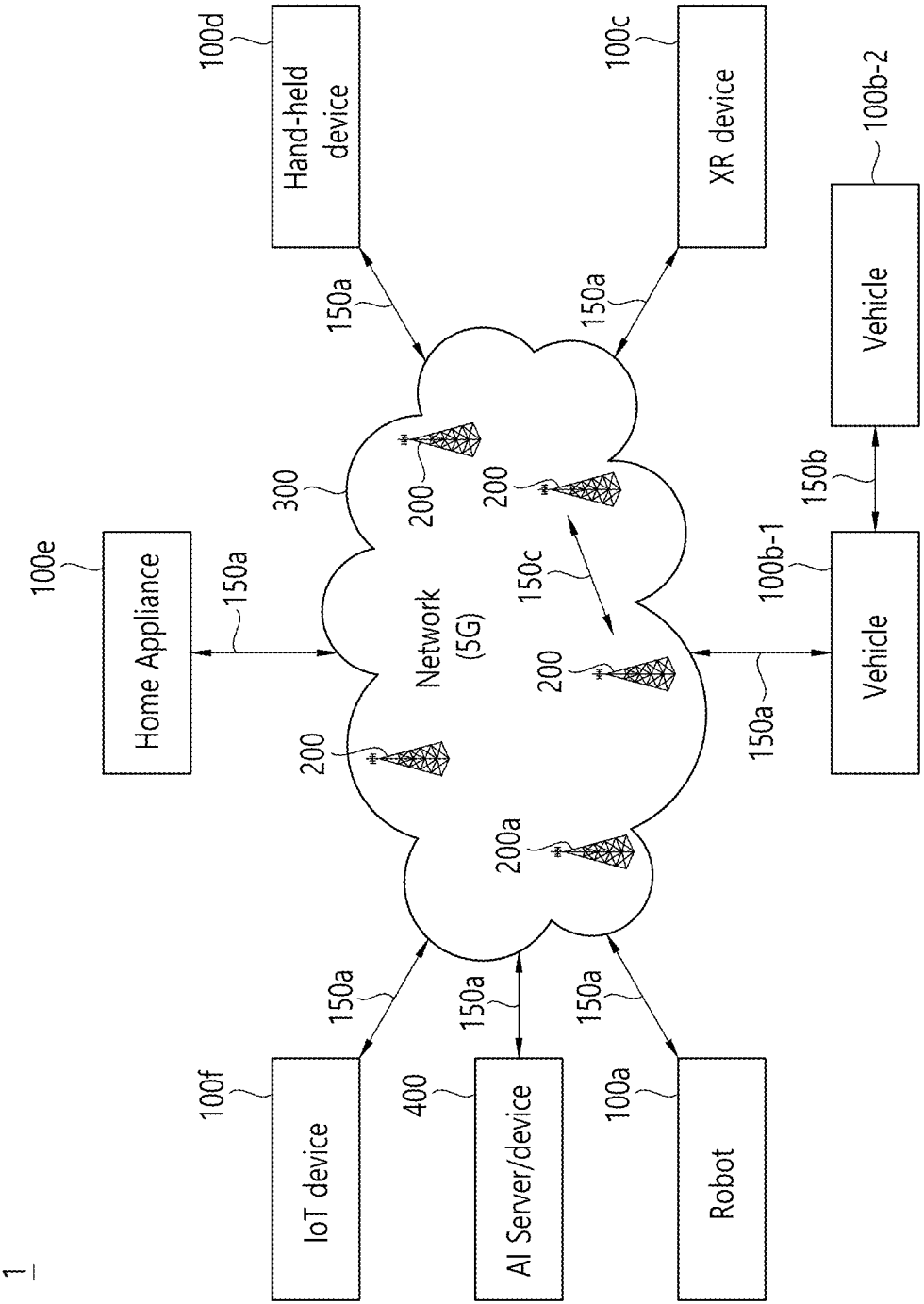
FIG. 21 shows an exemplary communication system (1), according to an embodiment of the present specification.

FIG. 21 shows an exemplary communication system (1), according to an embodiment of the present specification.

Referring to FIG. 21, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an extended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An Artificial Intelligence (AI) technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 11. Among the frequency ranges that are used in an NR system, FR1 may mean a "sub 6 GHz range", and FR2 may mean an "above 6 GHz range" and may also be referred to as a millimeter wave (mmW).

TABLE 11

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 12, FR1 may include a band within a range of 410 MHz to 7125 MHz. More specifically, FR1 may include a frequency band of 6 GHz (or 5850, 5900, 5925 MHZ, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 12

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

Figure 22:
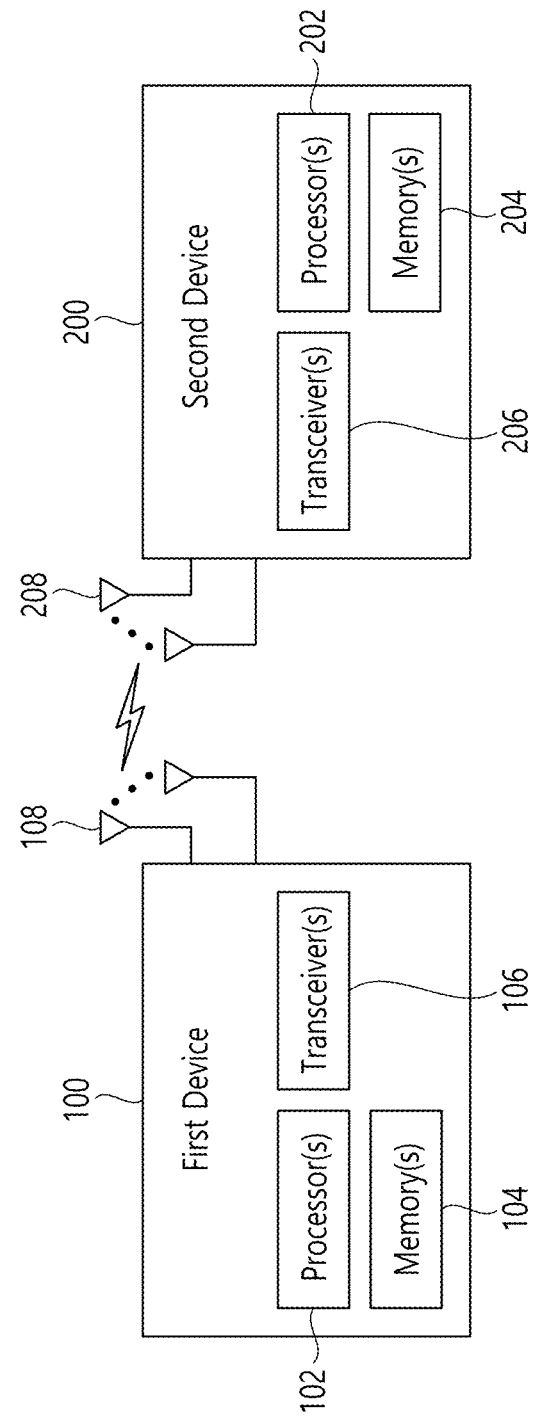
FIG. 22 shows an exemplary wireless device to which the present specification can be applied.

FIG. 22 shows an exemplary wireless device to which the present specification can be applied.

Referring to FIG. 22, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 21.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 23:
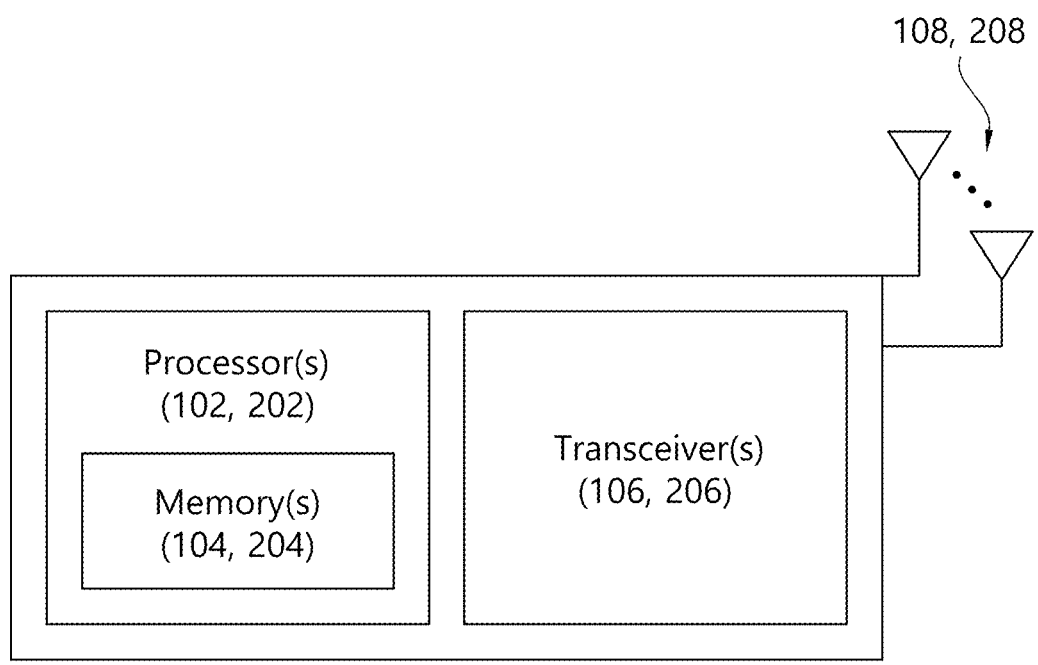
FIG. 23 shows another example of a wireless device applicable to the present specification.

FIG. 23 shows another example of a wireless device applicable to the present specification.

According to FIG. 23, the wireless device may include at least one processor (102, 202), at least one memory (104, 204), at least one transceiver (106, 206), and/or one or more antennas (108, 208).

As a difference between the example of the wireless device described above in FIG. 22 and the example of the wireless device in FIG. 23, in FIG. 22, the processors 102 and 202 and the memories 104 and 204 are separated, but in the example of FIG. 23, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

Figure 24:
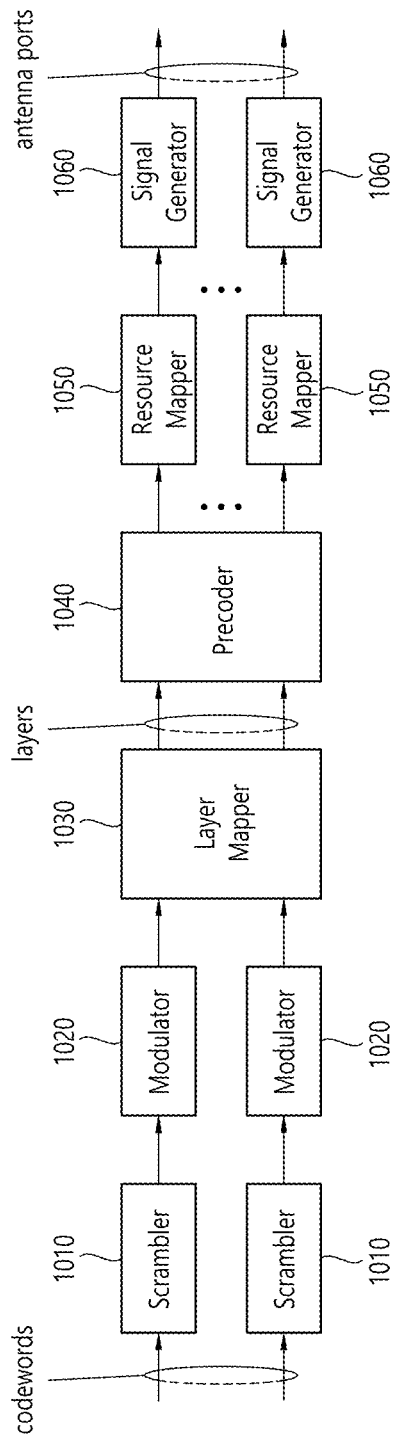
FIG. 24 shows a signal process circuit for a transmission signal according to an embodiment of the present specification.

FIG. 24 shows a signal process circuit for a transmission signal according to an embodiment of the present specification.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 22. Hardware elements of FIG. 24 may be implemented by the processors (102, 202) and/or the transceivers (106, 206) of FIG. 22. For example, blocks 1010~1060 may be implemented by the processors (102, 202) of FIG. 22. Alternatively, the blocks 1010~1050 may be implemented by the processors (102, 202) of FIG. 22 and the block 1060 may be implemented by the transceivers (106, 206) of FIG. 22.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 24. For example, the wireless devices (e.g., 100, 200 of FIG. 22) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 25:
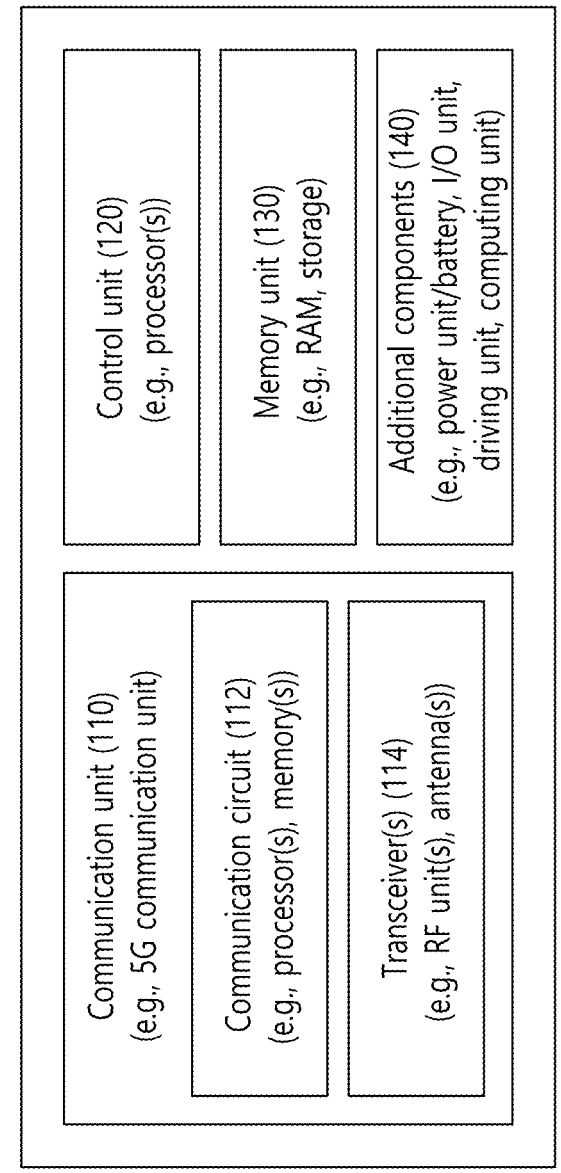
FIG. 25 shows another example of a wireless device according to an embodiment of the present specification.

FIG. 25 shows another example of a wireless device according to an embodiment of the present specification. The wireless device may be implemented in various forms according to a use-case/service (refer to FIG. 21).

Referring to FIG. 25, wireless devices (100, 200) may correspond to the wireless devices (100, 200) of FIG. 22 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 22. For example, the transceiver(s) (114) may include the one or more transceivers (106, 206) and/or the one or more antennas (108, 208) of FIG. 22. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 21), the vehicles (100b-1, 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, and so on. The wireless device may be used in a mobile or fixed place according to a usage-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
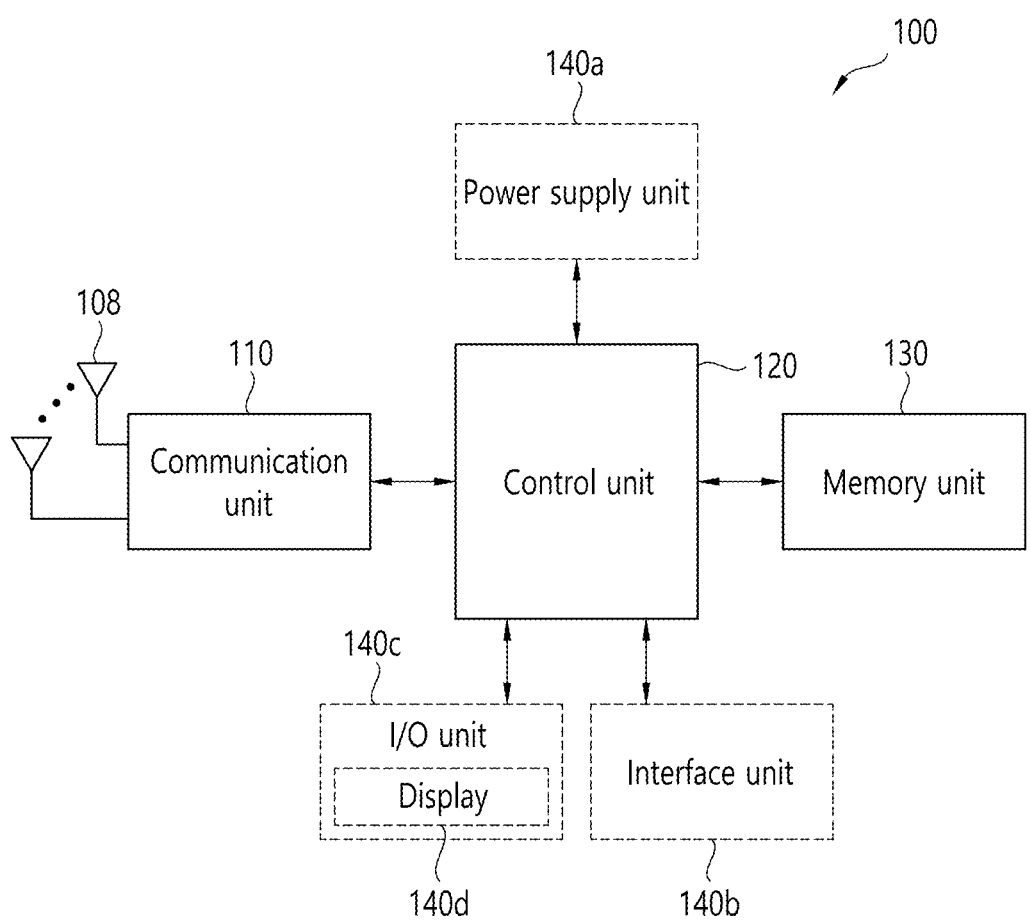
FIG. 26 shows a hand-held device to which the present specification is applied.

FIG. 26 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface un,it (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

Figure 27:
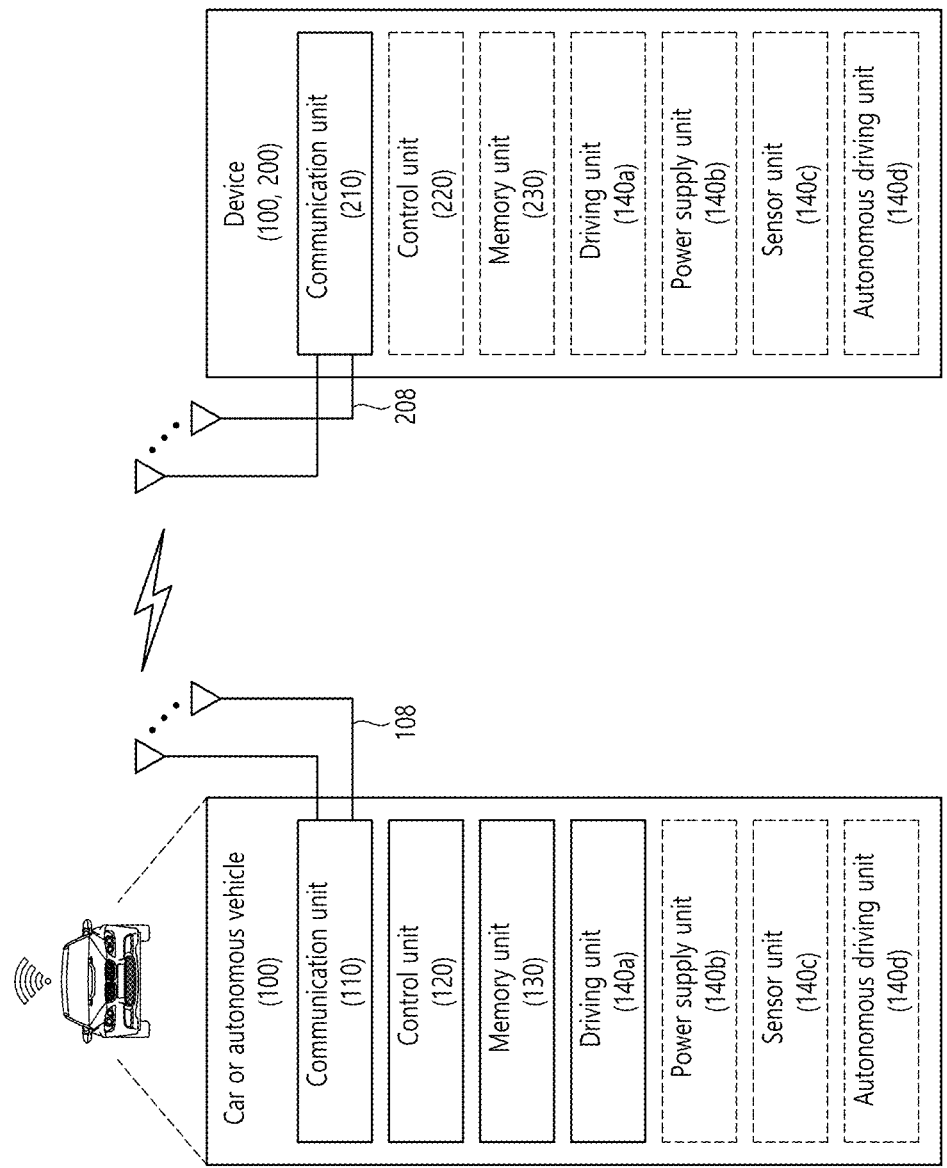
FIG. 27 shows a vehicle or an autonomous vehicle to which the present specification is applied.

FIG. 27 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 27, a vehicle or autonomous vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140*a*) may cause the vehicle or the autonomous vehicle (100) to drive on a road. The driving unit (140*a*) may include an engine, a motor, a powertrain, a wheel, a brake, a steering device, and so on. The power supply unit (140*b*) may supply power to the vehicle or the autonomous vehicle (100) and include a wired/wireless charging circuit, a battery, and so on. The sensor unit (140*c*) may obtain a vehicle state, ambient environment information, user information, and so on. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method of transmitting downlink control information by a base station in a wireless communication system, the method comprising:
   transmitting, to a user equipment (UE), the downlink control information on a physical downlink control channel (PDCCH); and
   performing a transmission to the UE on a physical downlink shared channel (PDSCH) based on the downlink control information,
   wherein the downlink control information includes minimum applicable scheduling offset information which informs the UE of a minimum applicable slot offset,
   wherein the minimum applicable slot offset is an offset related to the UE not being expected to receive the PDSCH based on a slot offset smaller than the minimum applicable slot offset, and
   wherein the minimum applicable slot offset is not applied based on the PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0 and a default PDSCH time domain resource allocation being used.

2. The method of claim 1, wherein the transmission on the PDSCH is performed based on the default PDSCH time domain resource allocation.

3. The method of claim 2, wherein the transmission on the PDSCH is performed based on a specific slot offset defined in the default PDSCH time domain resource allocation.

4. The method of claim 3, wherein the transmission on the PDSCH is performed in a slot after in which the downlink control information is transmitted plus the specific slot offset.

5. The method of claim 1, wherein, based on the default PDSCH time domain resource allocation being used and a PDSCH transmission being scheduled with the C-RNTI, the C-RNTI or the MCS-C-RNTI in a UE specific search space (USS) and the common search space associated with a CORESET except for the CORESET 0, the minimum applicable slot offset is not applied to the UE.

6. The method of claim 1, wherein minimum applicable slot offset candidate information is transmitted to the UE through a higher layer signaling.

7. The method of claim 1, wherein the downlink control information is downlink control information (DCI) format 1_1, and wherein DCI format 1_1 schedules the PDSCH.

8. A base station comprising:
at least one transceiver;
at least one memory; and
at least one processor operatively connected to the at least one memory and the at least one transceiver,
wherein the processor is adapted to:
control the transceiver to transmit, to a user equipment (UE), downlink control information on a physical downlink control channel (PDCCH); and
control the transceiver to perform a transmission to the UE on a physical downlink shared channel (PDSCH) based on the downlink control information,
wherein the downlink control information includes minimum applicable scheduling offset information which informs the UE of a minimum applicable slot offset,
wherein the minimum applicable slot offset is an offset related to the UE not being expected to receive the PDSCH based on a slot offset smaller than the minimum applicable slot offset, and
wherein the minimum applicable slot offset is not applied based on the PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0 and a default PDSCH time domain resource allocation being used.

9. The base station of claim 8, wherein the transmission on the PDSCH is performed based on the default PDSCH time domain resource allocation.

10. The base station of claim 9, wherein the transmission on the PDSCH is performed based on a specific slot offset defined in the default PDSCH time domain resource allocation.

11. The base station of claim 10, wherein the transmission on the PDSCH is performed in a slot after in which the downlink control information is transmitted plus the specific slot offset.

12. The base station of claim 8, wherein, based on the default PDSCH time domain resource allocation being used and a PDSCH transmission being scheduled with the C-RNTI, the C-RNTI or the MCS-C-RNTI in a UE specific search space (USS) and the common search space associated with a CORESET except for the CORESET 0, the minimum applicable slot offset is not applied to the UE.

13. The base station of claim 8, wherein minimum applicable slot offset candidate information is transmitted to the UE through a higher layer signaling.

14. The base station of claim 8, wherein the downlink control information is downlink control information (DCI) format 1_1, and wherein DCI format 1_1 schedules the PDSCH.

15. A processor, the processor is adapted to:
control a transceiver to transmit, to a user equipment (UE), downlink control information on a physical downlink control channel (PDCCH); and
control the transceiver to perform a transmission to the UE on a physical downlink shared channel (PDSCH) based on the downlink control information,
wherein the downlink control information includes minimum applicable scheduling offset information which informs the UE of a minimum applicable slot offset,
wherein the minimum applicable slot offset is an offset related to the UE not being expected to receive the PDSCH based on a slot offset smaller than the minimum applicable slot offset, and
wherein the minimum applicable slot offset is not applied based on the PDSCH transmission being scheduled with a cell-radio network temporary identifier (C-RNTI), a configured scheduling-RNTI (CS-RNTI) or a modulation and coding scheme-cell-RNTI (MCS-C-RNTI) in a common search space associated with a control resource set (CORESET) 0 and a default PDSCH time domain resource allocation being used.

16. The processor of claim 15, wherein the transmission on the PDSCH is performed based on the default PDSCH time domain resource allocation.

17. The processor of claim 16, wherein the transmission on the PDSCH is performed based on a specific slot offset defined in the default PDSCH time domain resource allocation.

18. The processor of claim 17, wherein the transmission on the PDSCH is performed in a slot after in which the downlink control information is transmitted plus the specific slot offset.

19. The processor of claim 15, wherein, based on the default PDSCH time domain resource allocation being used and a PDSCH transmission being scheduled with the C-RNTI, the C-RNTI or the MCS-C-RNTI in a UE specific search space (USS) and the common search space associated with a CORESET except for the CORESET 0, the minimum applicable slot offset is not applied to the UE.

20. The processor of claim 15, wherein minimum applicable slot offset candidate information is transmitted to the UE through a higher layer signaling.

* * * * *